United States Patent
Voelker

(10) Patent No.: US 10,627,082 B1
(45) Date of Patent: Apr. 21, 2020

(54) ROW MOUNTABLE MODULAR FLAT PANEL LUMINAIRE

(71) Applicant: Eaton Intelligent Power Limited, Dublin (IE)

(72) Inventor: Christopher Voelker, Lexington, KY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/284,982

(22) Filed: Feb. 25, 2019

(51) Int. Cl.
| | | |
|---|---|---|
| *F21V 21/088* | (2006.01) |
| *F21V 21/005* | (2006.01) |
| *F21V 17/16* | (2006.01) |
| *F21V 13/04* | (2006.01) |
| *H01R 25/14* | (2006.01) |
| *F21V 21/34* | (2006.01) |
| *F21Y 115/10* | (2016.01) |

(52) U.S. Cl.
CPC ............ *F21V 21/005* (2013.01); *F21V 13/04* (2013.01); *F21V 17/16* (2013.01); *F21V 21/34* (2013.01); *H01R 25/142* (2013.01); *F21V 2200/00* (2015.01); *F21Y 2115/10* (2016.08)

(58) Field of Classification Search
CPC ...... F21V 21/00; F21V 21/002; F21V 21/005; F21V 21/35; F21S 4/20
See application file for complete search history.

(56) References Cited

U.S. PATENT DOCUMENTS

| 4,999,755 A * | 3/1991 | Lin | ............................ F21S 2/00 362/217.02 |
| 8,926,134 B2 * | 1/2015 | Hast | ....................... F21V 17/162 362/227 |
| 9,388,969 B2 | 7/2016 | Doubek | |
| 9,506,631 B2 * | 11/2016 | Erhard | ..................... F21V 17/16 |
| 9,565,769 B2 * | 2/2017 | Dankelmann | .......... H05K 1/189 |
| 2007/0285949 A1 * | 12/2007 | Lodhie | ..................... F21S 8/038 362/648 |
| 2009/0244909 A1 * | 10/2009 | Chen | ................... F21V 19/0045 362/368 |
| 2010/0271834 A1 * | 10/2010 | Muessli | .................. F21V 21/35 362/398 |
| 2012/0106135 A1 | 5/2012 | Chen | |
| 2013/0021791 A1 * | 1/2013 | Hsu | ........................... F21S 4/20 362/217.13 |
| 2013/0322110 A1 | 12/2013 | Cantu | |
| 2014/0036503 A1 | 2/2014 | Olsen | |

(Continued)

*Primary Examiner* — Andrew J Coughlin
(74) *Attorney, Agent, or Firm* — King & Spalding LLP

(57) ABSTRACT

A modular luminaire includes a pair of side rail assemblies that support a light transmission assembly therebetween. Each side rail assembly includes a light assembly cavity and an alignment slot that houses an alignment rod therein. A coupling bracket that includes a latch device is coupled to the pair of side rail assemblies. A light source is disposed in the light assembly cavity of at least one of the pair of side rail assemblies such that an edge of a lightguide panel of the light transmission assembly is disposed adjacent the light source. The lightguide panel receives light from the light source through the edge and emits the light through a surface that is substantially perpendicular to the edge. The alignment rod of at least one of the pair of side rail assemblies and the latch device operate in concert to row mount the luminaire with another luminaire.

20 Claims, 21 Drawing Sheets

(56) References Cited

U.S. PATENT DOCUMENTS

| | | |
|---|---|---|
| 2014/0098564 A1 | 4/2014 | Magnan |
| 2016/0018092 A1* | 1/2016 | Knaapen ................ F21S 2/005 |
| | | 362/235 |
| 2016/0033098 A1* | 2/2016 | Bergman ................ H02G 3/20 |
| | | 362/418 |
| 2016/0033099 A1* | 2/2016 | Bergman ................ F21S 8/061 |
| | | 362/236 |
| 2016/0363710 A1 | 12/2016 | Van Boven |
| 2017/0009942 A1 | 1/2017 | Myers |
| 2017/0242177 A1 | 8/2017 | Howe |
| 2018/0031212 A1 | 2/2018 | Nguyen |
| 2018/0128434 A1 | 5/2018 | Moon |
| 2019/0339445 A1 | 11/2019 | Hawthorne |

* cited by examiner

ROW MOUNTABLE MODULAR FLAT PANEL LUMINAIRE

TECHNICAL FIELD

Embodiments of the present disclosure relate generally to luminaires, and more particularly to a row mountable modular flat panel luminaire.

BACKGROUND

Conventional flat panel luminaires are typically backlit, i.e., a lens or a diffuser panel of the luminaire is illuminated from behind by a light source, which in turn limits the minimum achievable thickness of the luminaire because there needs to be some space between the light source and the lens or diffuser to provide even illumination from the luminaire without prominent areas that are brighter (known as hot spots) than other areas. Further, conventional flat panel luminaires may not be configured for easy continuous and seamless row mounting.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a luminaire that includes a first side rail assembly that includes a first alignment slot and a first light assembly cavity formed therein. Further, the luminaire includes a first alignment rod disposed in the first alignment slot. The luminaire also includes a second side rail assembly disposed opposite to and spaced apart from the first side rail assembly such that the first side rail assembly and the second side rail assembly define a light emitting aperture therebetween. The second side rail assembly includes a second alignment slot. Furthermore, the luminaire includes a second alignment rod disposed in the second alignment slot. The luminaire includes a coupling bracket that is coupled to the first side rail assembly and the second side rail assembly. The coupling bracket includes a latch disposed thereon. Additionally, the luminaire includes a light source disposed in the first light assembly cavity of the first side rail assembly and a light transmission assembly. The light transmission assembly includes a lightguide panel that is supported by and disposed between the first side rail assembly and the second side rail assembly such that: (a) at least a portion of the light transmission assembly covers the light emitting aperture, and (b) an edge of the lightguide panel is positioned adjacent the light source to receive light therefrom and emit the light through a major surface of the lightguide panel and the light emitting aperture. The edge of the lightguide panel is substantially perpendicular to the major surface of the lightguide panel.

In another aspect, the present disclosure relates to a row mounted luminaire assembly that includes a first luminaire. The first luminaire includes a pair of first side rail assemblies, where each first side rail assembly includes a first alignment slot having a first alignment rod disposed therein and a first light assembly cavity. Further, the first luminaire includes a first coupling bracket that is coupled to the pair of first side rail assemblies and a first latching device disposed thereon. Furthermore, the first luminaire includes a first light source that is disposed in the first light assembly cavity of one of the pair of first side rail assemblies, and a first light transmission assembly that is supported on and disposed between the pair of first side rail assemblies. The row mounted luminaire assembly further includes a second luminaire that includes a pair of second side rail assemblies. Each second side rail assembly includes a second alignment slot having a second alignment rod disposed therein and a second light assembly cavity. Further, the second luminaire includes a second coupling bracket that is coupled to the pair of second side rail assemblies and comprising a second latching device disposed thereon. Furthermore, the second luminaire includes a second light source that is disposed in the second light assembly cavity of one of the pair of second side rail assemblies, and a second light transmission assembly that is supported on and disposed between the pair of second side rail assemblies. The first luminaire is coupled to the second luminaire using the first alignment rod of at least one of the pair of first side rail assemblies, the second alignment rod of at least one of the pair of second side rail assemblies, the first latching device, and the second latching device to form a continuous row of luminaires.

These and other aspect, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
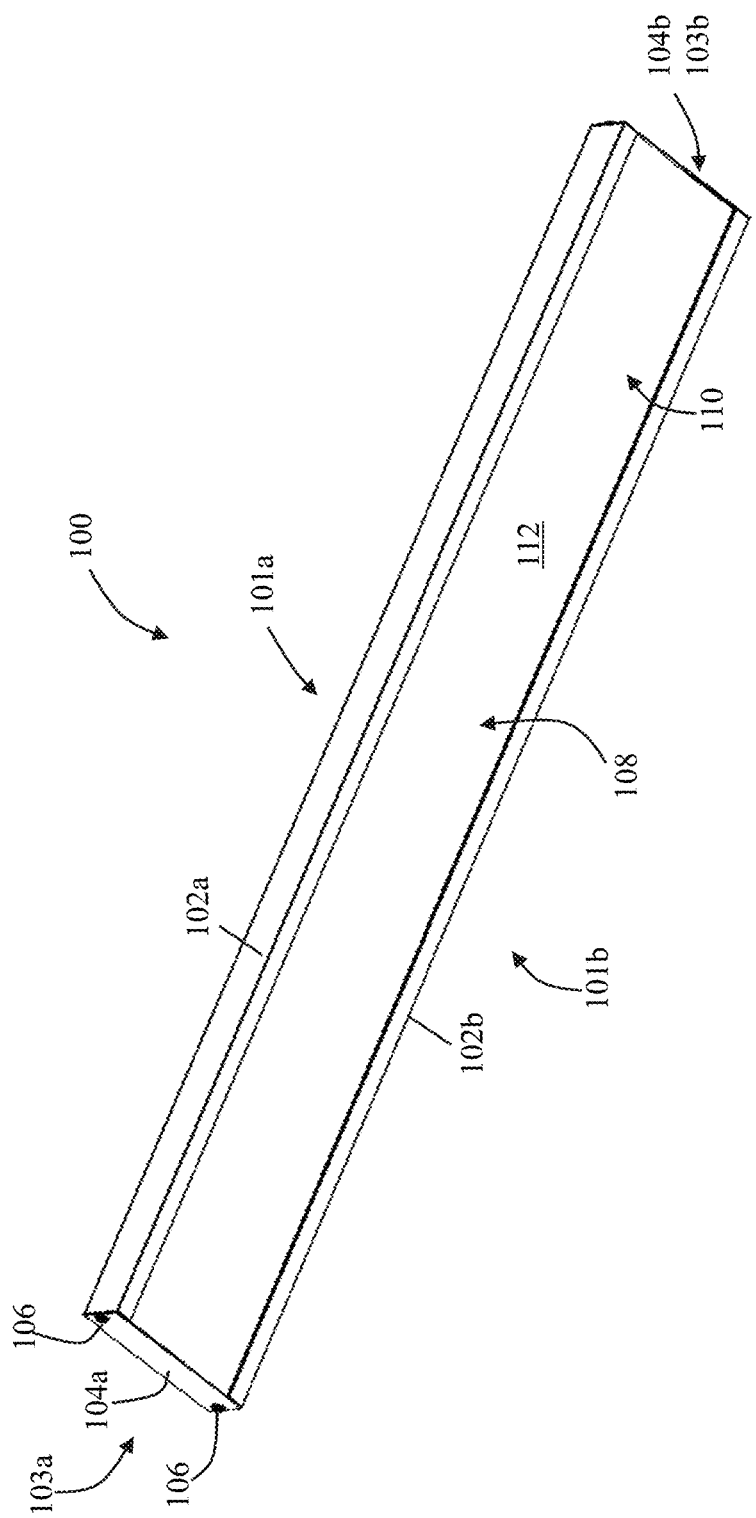
FIG. 1 illustrates a bottom perspective view of an example row mountable modular flat panel luminaire, in accordance with a prior art luminaire.
Figure 2:
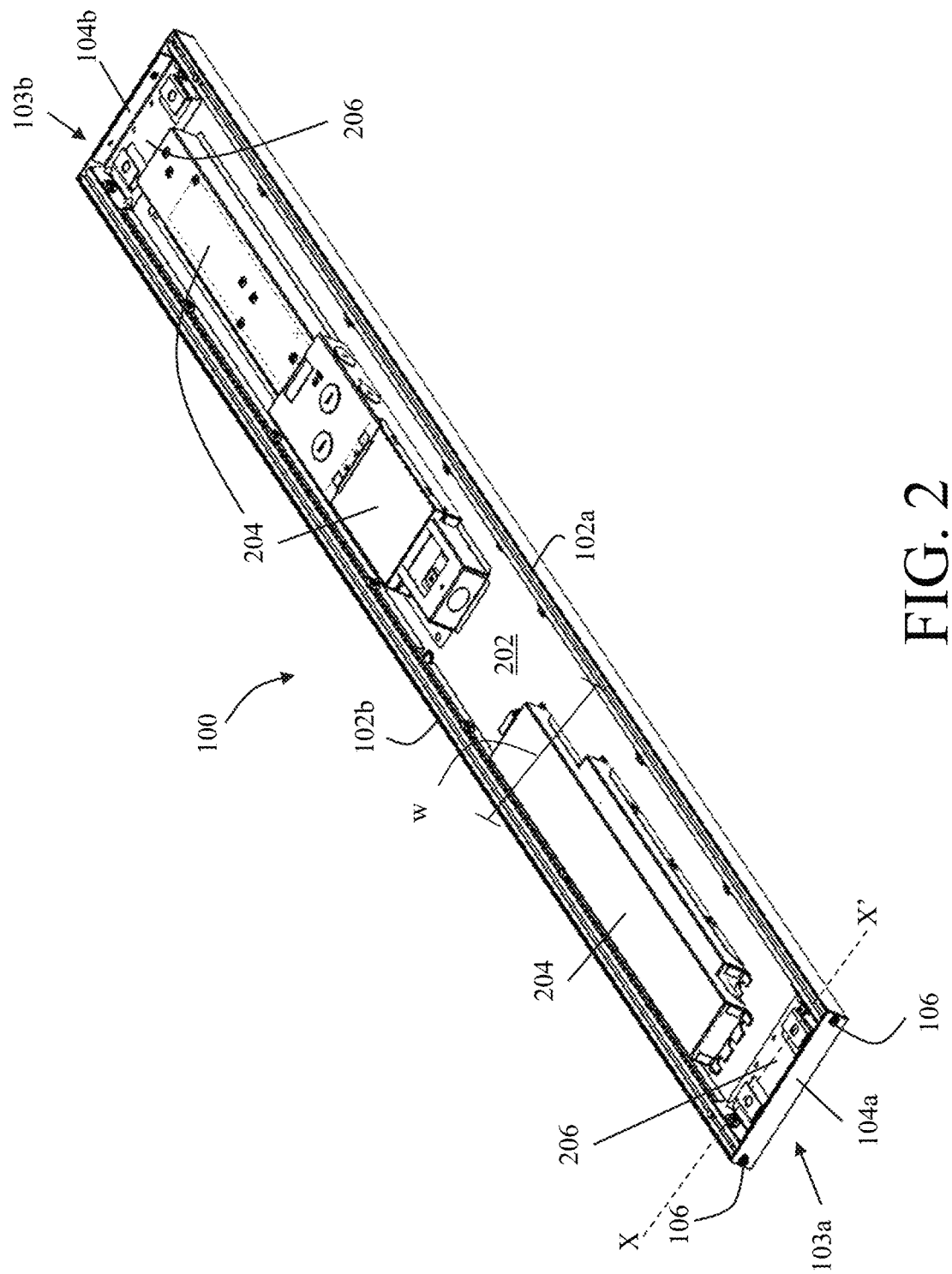
FIG. 2 illustrates a top perspective view of the row mountable modular flat panel luminaire of FIG. 1, in accordance with a prior art luminaire.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, a row mountable modular flat panel luminaire (hereinafter 'modular luminaire') will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The modular luminaire of the present disclosure is designed as an edge-lit lightguide based luminaire where light is emitted from the luminaire through a major surface of a lightguide panel of the luminaire that is "edge lit" by a light source from one or more edge surfaces of the lightguide panel which are substantially perpendicular to the major surface of the lightguide panel. Further, the modular luminaire of the present disclosure is configured for use in both standalone configurations and row mounted configurations. In a standalone configuration, the modular luminaire may have end caps disposed on the lateral ends of the luminaire to form a complete border around a lightguide panel of the luminaire. However, in a row mounting configuration, the end panels from one or more of the lateral ends may be removed and the modular luminaire is physically coupled with other modular luminaires of the same kind to form a seamless continuous row. In either configuration, the modular luminaire may be configured for, but not limited to, recessed, T-grid, suspended, surface mount, flush mount, or mud-in installations. Furthermore, the modular luminaire is configured to accommodate a variety of optical films therein in order to change an optical distribution of the light emitted from the light guide panel of the modular luminaire as desired (e.g. asymmetric distribution, bat wing distribution, narrow beam distribution, etc.).

An example modular luminaire of the present disclosure includes a lightguide panel that is bound by a pair of opposing first edges, a pair of opposing second edges, a first major surface, and a second major surface that is opposite to the first major surface. Further, the modular luminaire includes two side rail assemblies that are disposed opposite to each other. The two side rail assemblies receive and support the pair of opposing first edges of the lightguide panel such that the lightguide panel is disposed and retained in between the two side rail assemblies. Further, the modular luminaire includes a coupling bracket that is configured to secure or hold the two side rail assemblies together. The coupling bracket is coupled to one of the two side rail assemblies on one end and the other side rail assembly on an opposite end. Furthermore, the modular luminaire includes one or more draw latches that are disposed on the coupling bracket and in between the two side rail assemblies. In one example, the coupling bracket may include a hook side or a latch side of a draw latch disposed thereon, while in another example, the joining bracket may include a hook side of one draw latch and a latch side of another draw latch disposed thereon.

At least one of the two side rail assemblies houses a light source therein such that the light source is positioned adjacent to and facing the respective first edge of the lightguide panel. Light from the light source enters the lightguide panel through the first edge and is emitted through the first and/or the second major surfaces of the lightguide panel. Each of the two side rail assemblies further includes an alignment recess that houses an alignment tab therein. The modular luminaire may be coupled to another modular luminaire of the same kind using the alignment tabs and the draw latches of the modular luminaires to form a seamless continuous row of modular luminaires.

Additionally, the two side rail assemblies define an optical film cavity therebetween that is configured to receive an optical film therein and position the optical film below the lightguide panel such that the lightguide panel and the optical film are spaced apart from each other by an air gap. The optical film may be removably coupled to the modular luminaire thereby allowing an optical distribution of the light emitted from the light guide panel of the modular luminaire to be changed by replacing one optical film with another as desired. In a standalone configuration, the optical film can be installed by feeding one end of a roll of the optical film into the optical film cavity through one end of the modular luminaire, pulling it along the entire length of the modular luminaire, until the optical film reaches the opposite end of the modular luminaire. In the continuous row mounted configuration, the optical film is installed by feeding the roll of optical film into the optical film cavity of the first modular luminaire in the continuous row, and then pulling it through the optical film cavities of adjoining modules of the continuous row of modular luminaires.

Alternatively, the optical film may be flexible enough to bend and insert into the optical cavity.

In one example, the modular luminaire may be rectilinear in shape, whereas, in other examples, the modular luminaire may have any other appropriate shape without departing from a broader scope of the present disclosure. For example, the modular luminaire may be L-shaped. Further, the modular luminaire may have different aspect ratios. For example, the length and widths of the different modular luminaires may include, but are not limited to, 4 feet*6 inches, or 2 feet*6 inches, or 4 feet*4 inches, 2 feet*4 inches, etc.

Moving now to discuss the figures, FIGS. 1-10 and 20 illustrate an example embodiment of the modular luminaire 100 that is row mountable. Referring to FIGS. 1-10 and 20, the modular luminaire 100 may include a first side rail assembly 102a and a second side rail assembly 102b. The first and second side rail assemblies (102a, 102b) may be disposed opposite to and spaced apart from each other such that they form a light emitting aperture 108 therebetween. Further, the modular luminaire 100 may include a light transmission assembly 110, where the longitudinal edges (101a, 101b) of the light transmission assembly 110 are supported by the first and second side rail assemblies (102a, 102b) such that the light transmission assembly 110 is disposed in and covers the light emitting aperture 108. Furthermore, the modular luminaire 100 may include end plates 104a and 104b that are disposed at and configured to cover lateral ends 103a and 103b, respectively, of the side rail assemblies (102a, 102b) and the modular luminaire 100. The end plates 104a and 104b may be removably coupled to the first and second side rail assemblies (102a, 102b) using fasteners 106 or any other appropriate coupling mechanism without departing from a broader scope of the present disclosure. As illustrated in FIG. 1, the end plates (104a, 104b) and the first and second side rail assemblies (102a, 102b) form a complete border around the light transmission assembly 110 of the modular luminaire 100.

Figure 6:
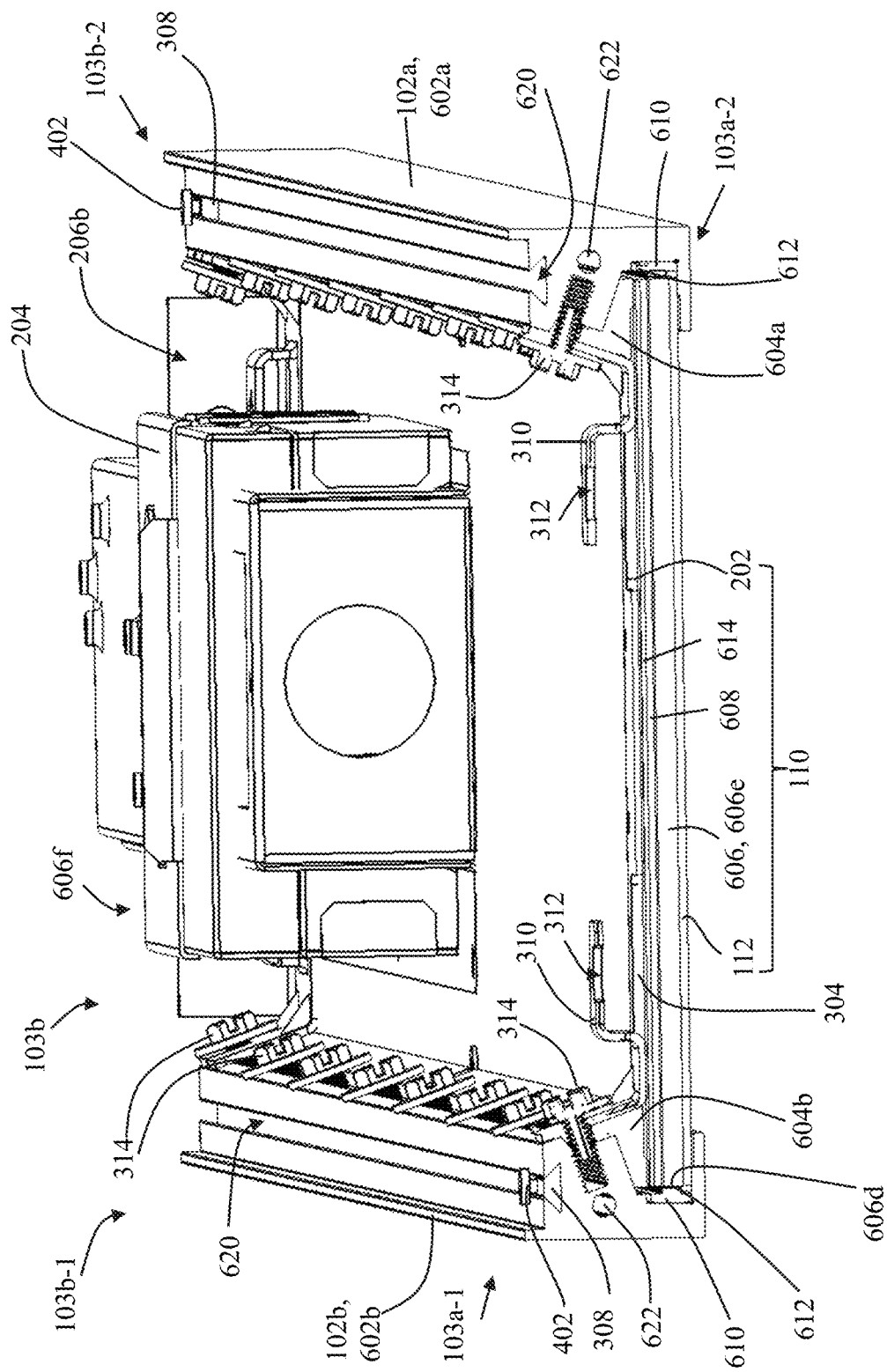
FIG. 6 illustrates a cross-sectional view of the row mountable modular flat panel luminaire of FIG. 1 along an X-X' axis (shown in FIG. 2), in accordance with example embodiments of the present disclosure.
Figure 8:
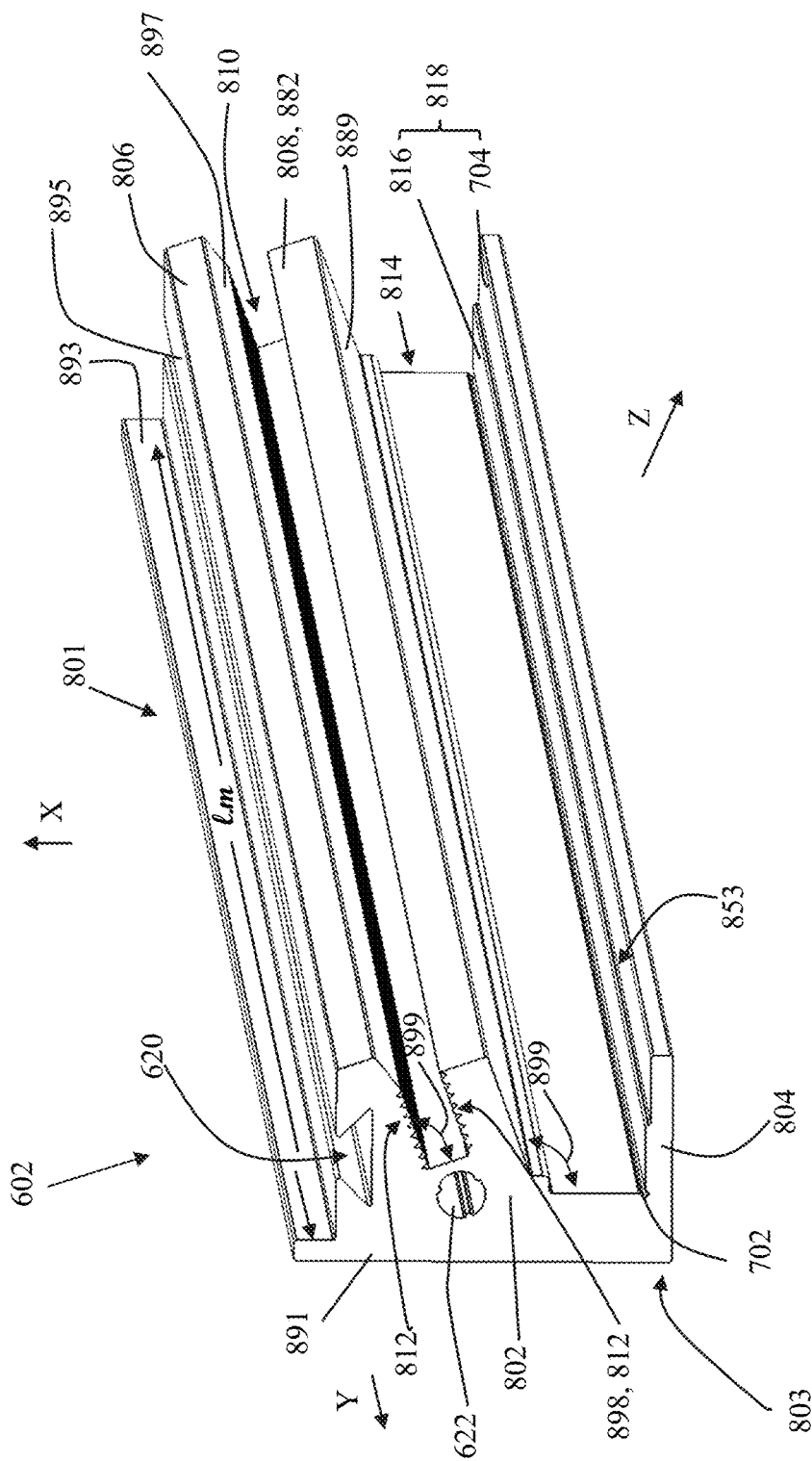
FIG. 8 illustrates a perspective view of a main member of a side rail assembly of the row mountable modular flat panel luminaire of FIG. 1, in accordance with example embodiments of the present disclosure.

As illustrated in FIG. 6, each side rail assembly (102a, 102b) may include a main member 602a, 602b and a compression member 604a, 604b that are coupled together using fasteners 314. Turning to FIG. 8, the main member 602a, 602b may include a side wall 802 that has an outer surface 891 and an inner surface 893 that is disposed opposite to the outer surface 891. Further, the main member 602 may include a support flange 804 that extends out from the inner surface 893 of the side wall 802 in a direction that faces away or opposite to the outer surface 891 of the side wall 802. The support flange 804 may be disposed adjacent a bottom end 803 of the side wall 802 and may be substantially perpendicular to the side wall 802. A top surface 853 of the support flange 804 may define a stepped shoulder 818 that comprises an upper step surface 816 and a lower step surface 704. The support flange 804 of the main member 802 of each side rail assembly (102a, 102b) may be configured to support at least a portion of the light transmission assembly 110 and an optical film thereon such that: (a) the optical film is disposed below the light transmission assembly 110, and (b) the light transmission assembly 110 and the optical film are disposed in between the first and second side rail assemblies (102a, 102b) and cover the light emitting aperture 108 between the first and second side rail assemblies (102a, 102b).

Figure 13:
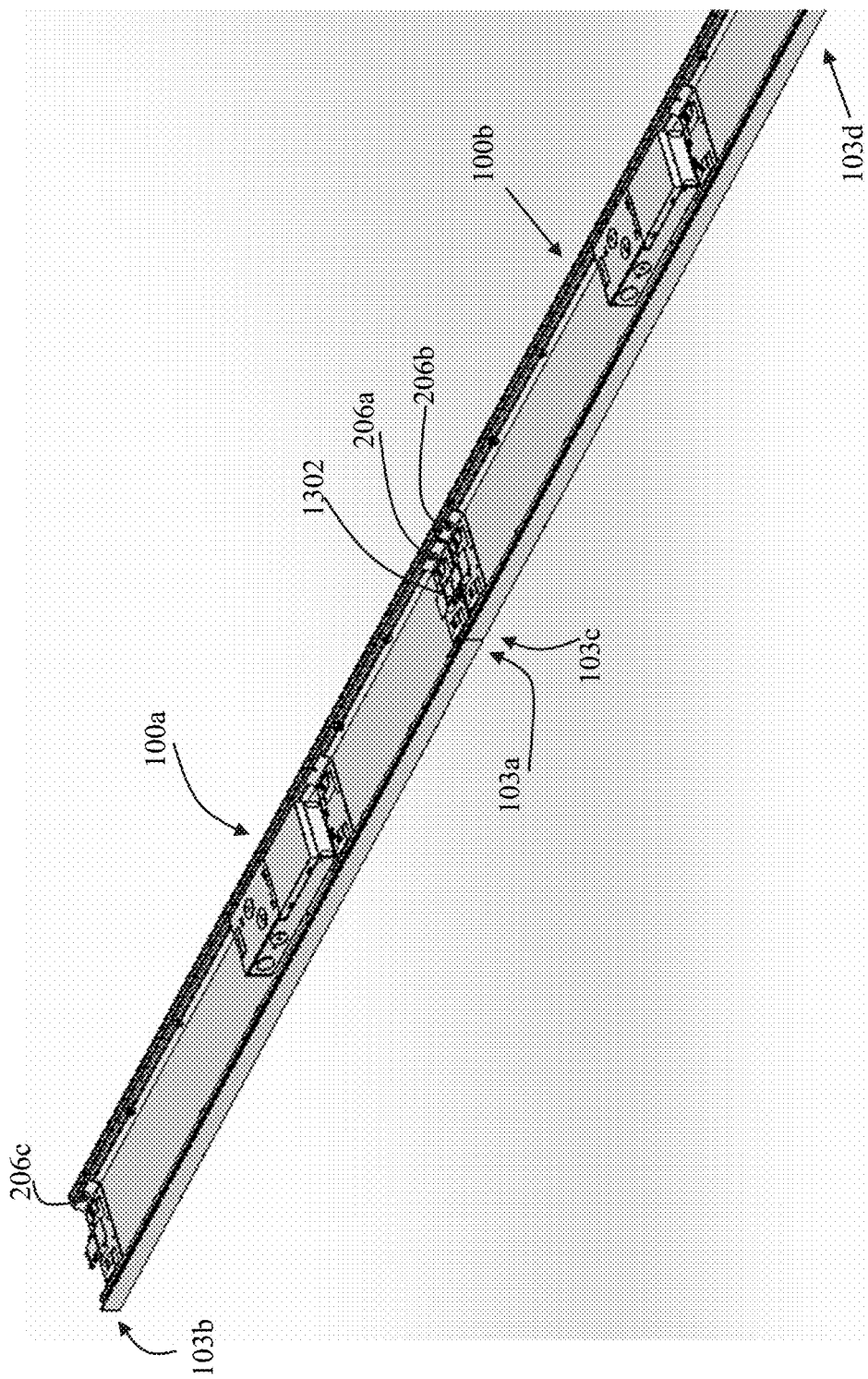
FIGS. 13 and 14 illustrate perspective views of an example row mount assembly comprising two row mountable modular flat panel luminaires that are in a row mounted configuration, in accordance with example embodiments of the present disclosure.
Figure 14:
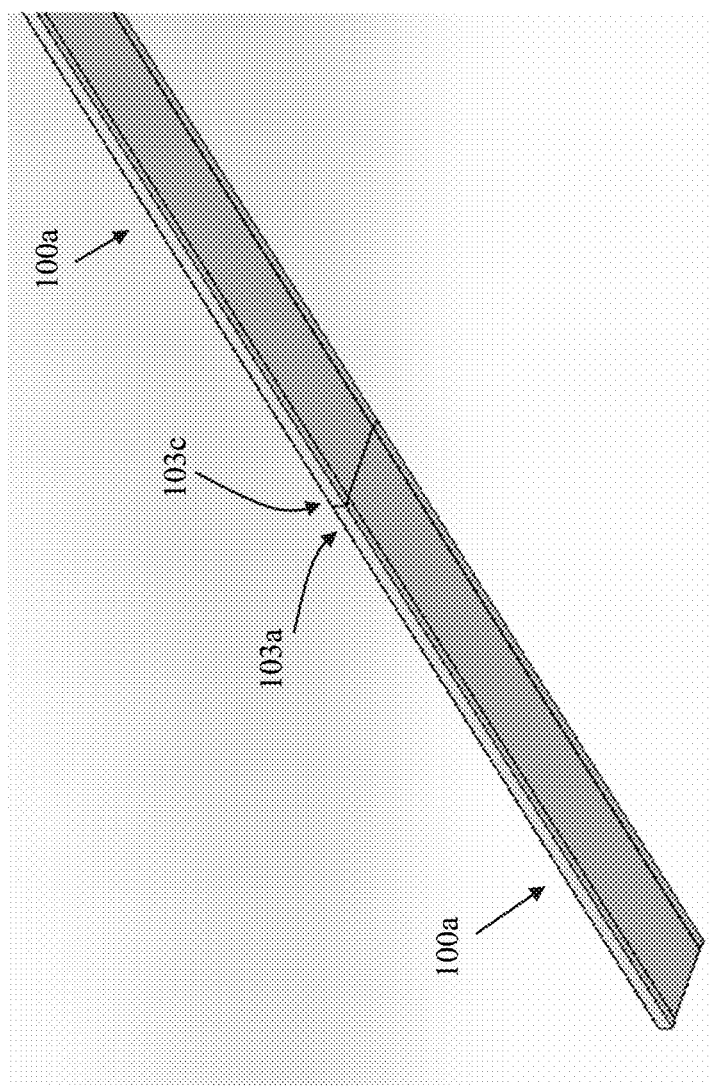
Figure 15:
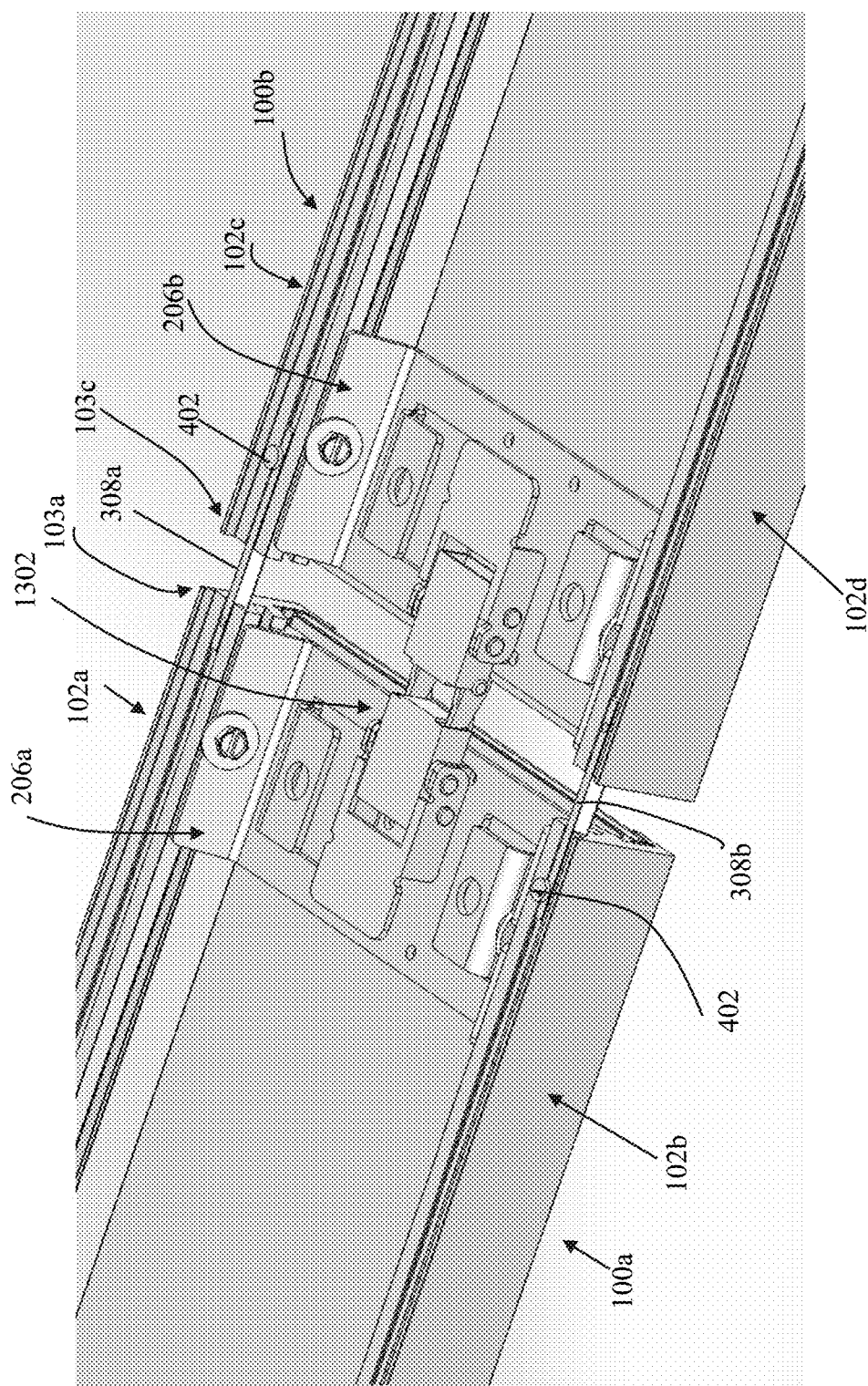
FIG. 15 illustrates an enlarged view of a portion of the row mounted assembly where the two row mounted flat panel luminaires of FIGS. 13 and 14 are coupled but not completely joined, in accordance with example embodiments of the present disclosure.

In addition to the support flange 804, the main member 602 may include a top coupling flange 806 that extends out from the inner surface 893 of the side wall 802 in a direction that faces away or opposite to the outer surface 891 of the side wall 802. The top coupling flange 806 may be offset from the top edge 801 of the side wall 802. In particular, as illustrated in FIG. 8, a top surface 895 of the top coupling flange 806 may be disposed below the top edge 801 of the side wall 802 and may be substantially perpendicular to the side wall 802, while the bottom surface 897 of the top coupling flange 806 may form an obtuse outer angle 899 with the side wall 802. Further, the top coupling flange 806 may comprise an alignment slot 620 formed therein. The alignment slot 620 may be a blind slot that extends from the top surface 895 towards the bottom surface 897 of the top coupling flange 806. The alignment slot 620 may be configured to receive an alignment rod 308 (shown in FIG. 5) therein, where the alignment rod 308 may be used to row mount the modular luminaire 100 with another modular luminaire 100b as shown in FIGS. 13-15.

Figure 5:
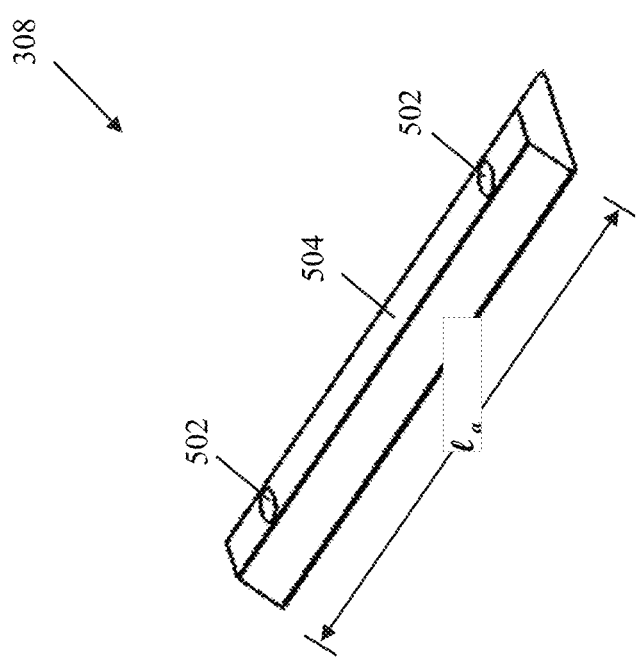
FIG. 5 illustrates a perspective view of an aligner rod of the row mountable modular flat panel luminaire of FIG. 1, in accordance with example embodiments of the present disclosure.

In one example embodiment, the alignment slot 620 may be substantially dovetail shaped, and the corresponding alignment rod 308 that is disposed therein may be substantially dovetail shaped as illustrated in FIG. 5. Even though the present disclosure describes the alignment slot 620 and the alignment rod 308 as being substantially dovetail shaped, one of skill in the art can understand and appreciate that in other example embodiments, the alignment slot 620 and the alignment rod 308 may have any other appropriate shape without departing from a broader scope of the present disclosure. For example, the alignment slot may be a C-shaped profile where the alignment slot extends from the top surface 895 of the top coupling flange 806 through the side wall 802 to the bottom end 803 of the main member 602. In either case, the shape of the alignment rod 308 may substantially match the shape of the alignment slot 620.

As illustrated in FIG. 5, the alignment rod 308 may have coupling holes 502 formed therein. The coupling holes 502 may be blind holes that extend from a top surface 504 towards a bottom surface of the alignment rod 308. In some example embodiments, the coupling holes 502 may be through holes. The coupling holes 502 of the alignment rod 308 may be configured to receive an alignment rod fastener 402 (shown in FIGS. 3 and 4) therein to securely couple and retain the alignment rod 308 in the alignment slot 620 of the main member 602 of each side rail assembly (102a, 102b). Inserting the alignment rod fastener 402 in at least one of the coupling holes 502 and tightening the alignment rod fastener 402 prevents the alignment rod 308 from sliding in and out of the alignment slot 620 in the Y-direction (shown in FIG. 8). Further, the dovetail shape of the alignment rod 308 and the alignment slot 620 along with the alignment rod fastener 402 prevents an undesirable vertical movement of the alignment rod 308 in the X-direction (shown in FIG. 8).

Figure 3:
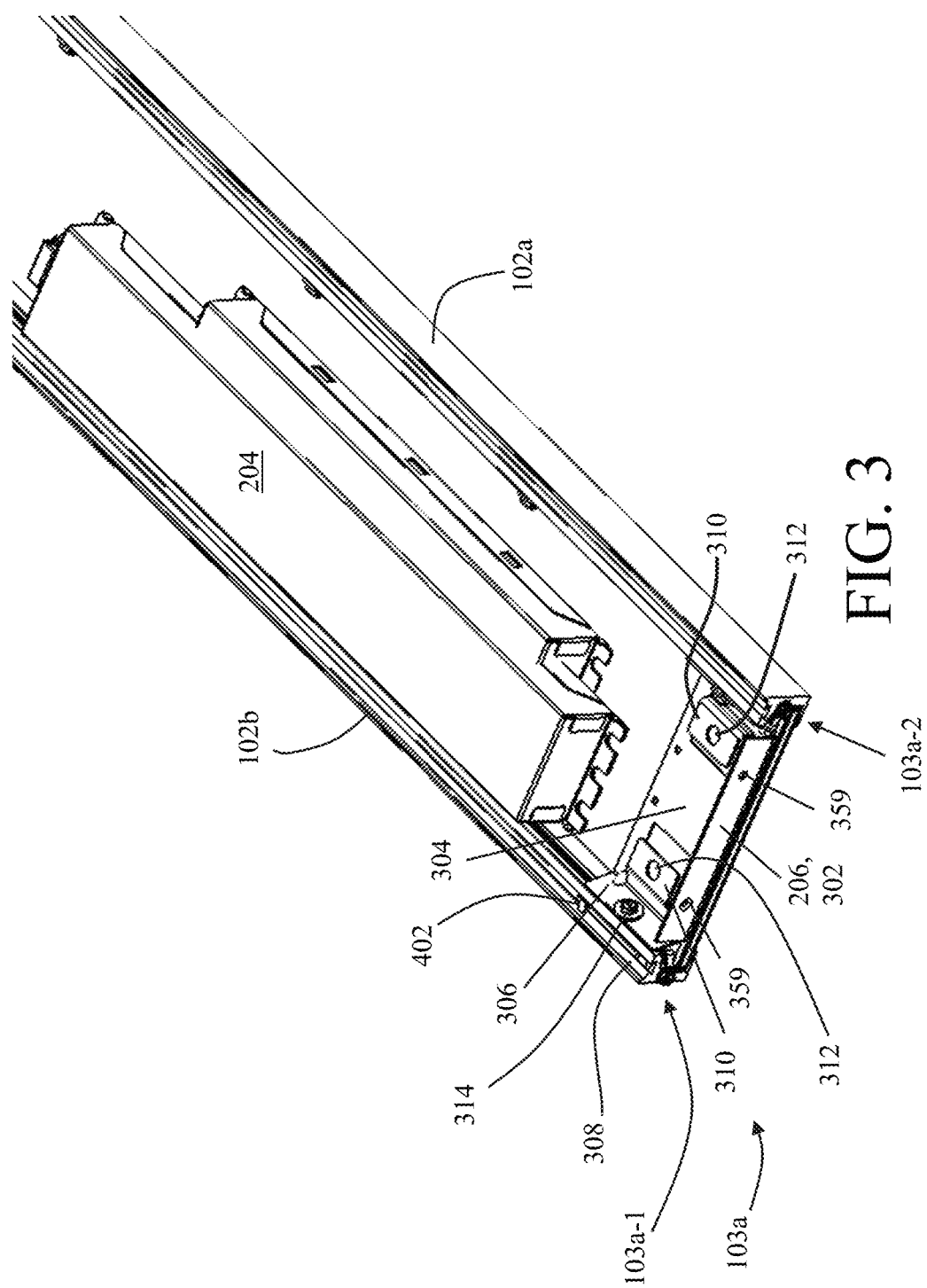
FIG. 3 illustrates an enlarged view of an end portion of the row mountable modular flat panel luminaire of FIG. 1, in accordance with example embodiments of the present disclosure.
Figure 4:
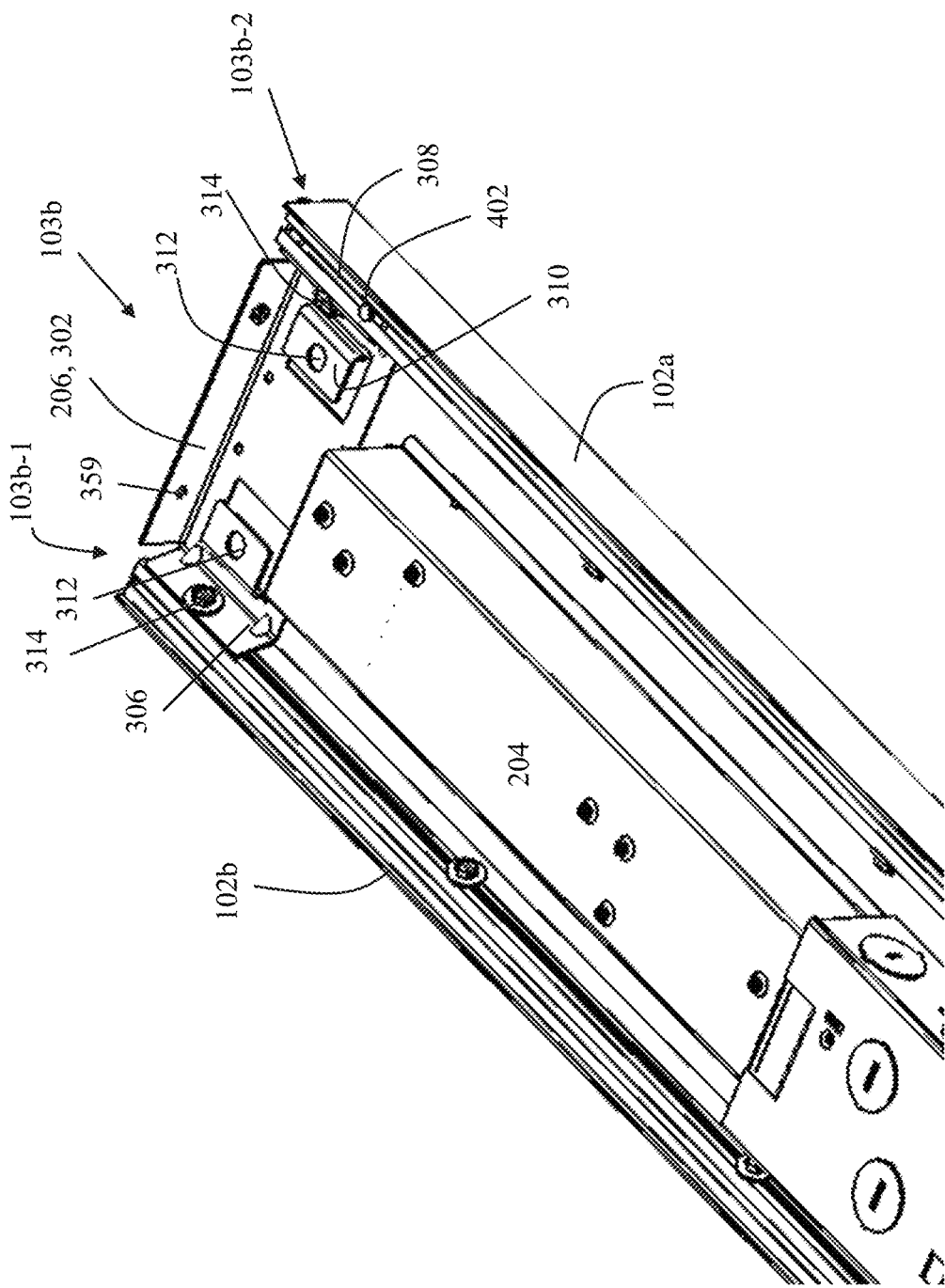
FIG. 4 illustrates an enlarged view of another end portion of the row mountable modular flat panel luminaire of FIG. 1, in accordance with example embodiments of the present disclosure.

As illustrated in FIGS. 3 and 4, the alignment rod 308 may not extend the entire length of the alignment slot 620 and/or main member 602, i.e., from the first lateral end 103a to the second lateral end 103b. In other words, the length 'l_a' of the alignment rod 308 may be less than the length 'l_m' of the main member 602 and/or the alignment slot 620.

Further, as illustrated in FIGS. 3 and 4, in the first side rail assembly 102a, the alignment rod 308 may be disposed in the alignment slot 620 of the main member 602 adjacent a first lateral end 103a of the first side rail assembly 102a; while in the second side rail assembly 102b, the alignment rod 308 may be disposed in the alignment slot 620 of the main member 602 adjacent a second lateral end 103b of the second side rail assembly 102b that is opposite to the first lateral end 103a. In other words, each modular luminaire 100 includes alignment rods 308 disposed at diagonally opposite lateral ends ((103a_1 and 103b_2) or (103a_2 and 103b_1)) of the modular luminaire 100 to allow the modular luminaire 100 to be coupled to another modular luminaire (e.g., 100b (shown in FIG. 13)) on either of the lateral ends (103a, 103b) of the modular luminaire 100 for row mounting. The modular luminaire 100 may be designed with the alignment rods 308 disposed at diagonally opposite lateral ends ((103a_1 and 103b_2) or (103a_2 and 103b_1)) of the modular luminaire 100 so that no matter which way the modular luminaire 100 is turned for coupling there will be an alignment rod. So, a technician does not need to spend additional time trying to match ends of the luminaire. Either end of both the luminaires can be coupled, thereby enabling quick row mounting of the modular luminaire 100 with other similar modular luminaires (e.g., 100b).

Returning to FIG. 8, the main member 602 may further include a bottom coupling flange 808 that extends out and angularly from the inner surface 893 of the side wall such that the bottom coupling flange 808 forms an obtuse outer angle 899 with the side wall 802. The bottom coupling flange 808 may extend in a direction that is facing away or opposite to the outer surface 891. The bottom coupling flange 808 may be substantially parallel to the top coupling flange 806, and the obtuse outer angle 899 formed between the bottom coupling flange 808 and the side wall 802 may be substantially similar to the obtuse outer angle 899 formed between the bottom surface 897 of the top coupling flange 806 and the side wall 802. Further, at least a portion of the bottom surface 897 of the top coupling flange 806 and at least a portion of the top surface 898 of the bottom coupling flange 808 may have threads 812 formed therein. The bottom coupling flange 808 and the top coupling flange 806 may be arranged such that the threaded portion 812 of the bottom surface 897 of the top coupling flange 806 faces the threaded portion 812 of the top surface 898 of the bottom coupling flange 808 to form a threaded screw slot 810 therebetween. Furthermore, the bottom coupling flange 808 and the support flange 804 may define a light assembly cavity 814 therebetween.

Figure 7:
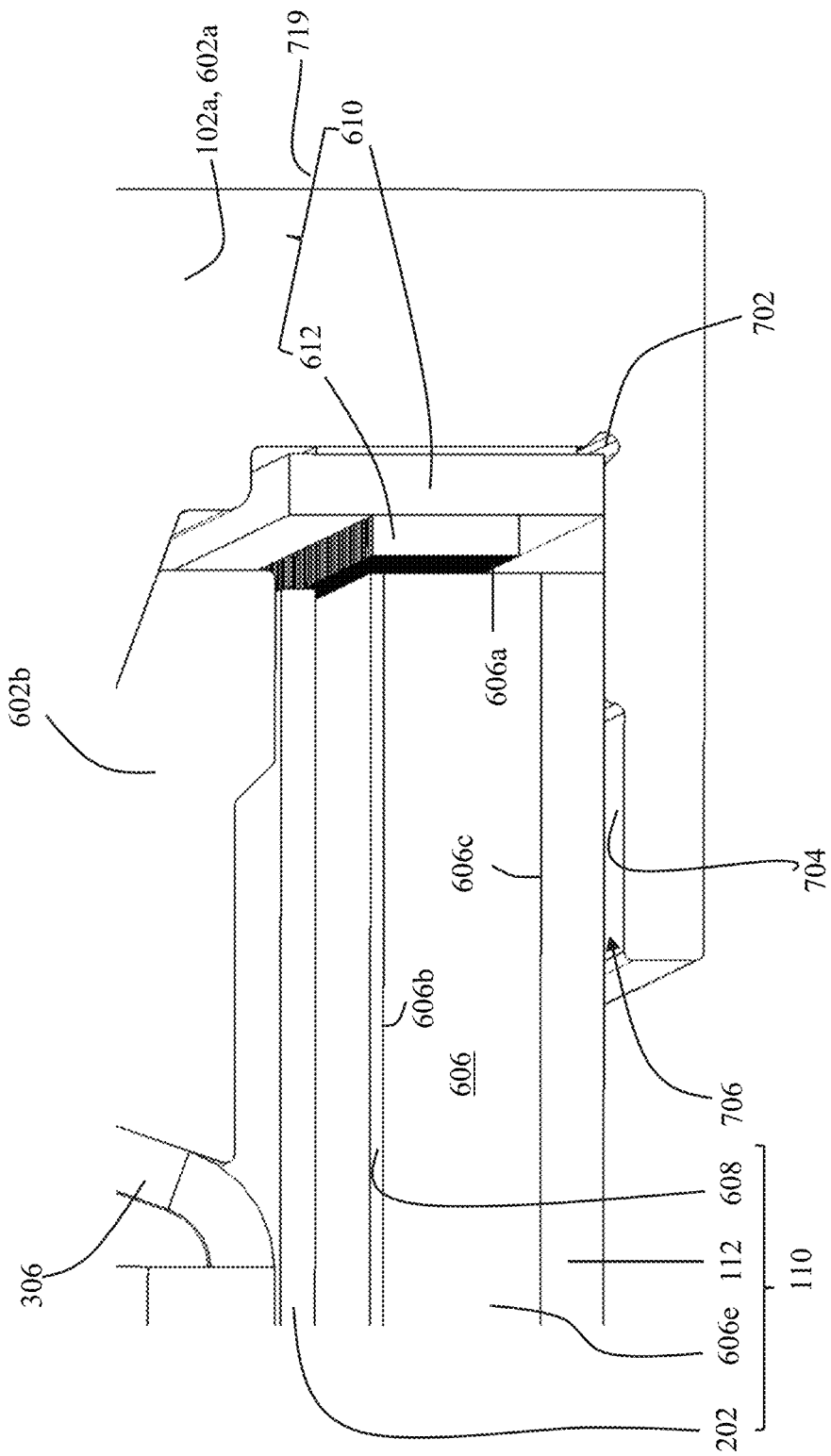
FIG. 7 illustrates an enlarged view of a cross-section of a portion of the row mountable modular flat panel luminaire of FIG. 1 along the X-X' axis, in accordance with example embodiments of the present disclosure.

The light assembly cavity 814 may be configured to receive and retain a light source assembly 719 and at least a portion of the light transmission assembly 110 therein such that a light source 612 of the light source assembly 719 is positioned adjacent an edge 606a of a lightguide panel 606 of the light transmission assembly 110 as illustrated in FIG. 7. As illustrated in FIGS. 6 and 7, the light source assembly 719 may include a substrate 610, such as a print circuit board, and a plurality of light emitting diodes (LEDs) 612 disposed thereon. In other example embodiments, the light source assembly 719 may include any other appropriate light source other than the LEDs without departing from a broader scope of the present disclosure. Further, the light transmission assembly 110 may include a lightguide panel 606, a diffuser lens 112, a reflector 608, a foam panel 614, and a back plate 202 that are stacked together. In particular, the lightguide panel 606 may be disposed between the reflector 608 and the diffuser lens 112 as illustrated in FIG. 7. Further, the back plate 202 may be disposed above the reflector 608 and the foam panel 614 may be disposed between the back plate 202 and the reflector 608. In some example embodiments, the foam panel 614 may be omitted (as illustrated in FIG. 7) without departing from a broader scope of the present disclosure.

The lightguide panel 606 may include a first major surface 606b and a second major surface 606c that is opposite to the first major surface 606b. Further, the lightguide panel 606 may include and may be bound by two long edges 606a and 606d that are opposite to each other; and two short edges 606e and 606f that are opposite to each other. The long and short edges (606a, 606d, 606e, and 606f) are disposed between the two major surfaces (606b, 606c). In one example embodiment, the major surfaces (606b, 606c) of the lightguide panel 606 may be patterned with microlenses that promote controlled release of light internally incident on those major surfaces (606b, 606c). The resulting light can provide beneficial illumination for an area that may be occupied by one or more people, for example. In other example embodiments, only one of the major surfaces (606b or 606c) may be patterned with microlenses. The microlenses can comprise conical features, truncated cones, convex shapes, or other appropriate features, for example.

As illustrated in FIGS. 6 and 7, a long edge of the light transmission assembly 110 rests on the upper step surface 816 of the support flange 804 of the main member 602 associated with the first side rail assembly 102a, while an opposite long edge of the light transmission assembly 110 rests on the upper step surface 816 of the support flange 804 of the main member 602 associated with the second side rail assembly 102b such that: (a) at least a portion of the light transmission assembly comprising the long edges (606a, 606d) of the lightguide panel 606 is disposed in the light assembly cavity 814 of each side rail assembly (102a, 102b), and (b) the light transmission assembly 110 extends between the two side rail assemblies (102a, 102b) such that it covers the light emitting aperture 108.

Further, the substrate 610 of the light source assembly 719 may be attached to an inner surface 893 of the side wall 802 of the main member 602 associated with at least one of the side rail assemblies (102a, 102b) such that the LEDs 612 disposed thereon are adjacent to and face a respective long edge (606a or 606d) of the lightguide panel 606 of the light transmission assembly 110. The main member 602 of each side rail assembly (102a, 102b) may include a relief cut 702 (shown in FIG. 7) formed between the side wall 802 and the support flange 804. The relief cut 702 may be configured to ensure that the bottom edge of the substrate 610 of the light source assembly 719 is flush with the upper step surface 816 of the support flange 804 and the light source 612 of the light source assembly 719 is aligned with the edge (e.g., 606a) of the lightguide panel 606.

Light from the LEDs 612 may enter the lightguide panel 606 via a long edge 606a of the lightguide panel 606 (or 606d if LEDs are disposed in the other side rail assembly 102b) facing the LEDs 612. Further, light from the LEDs 612 that enters the lightguide panel 606 through the long edge 606a may be guided towards the opposite long edge by the major surfaces (606b, 606c) of the lightguide panel 606. The major surfaces (606b, 606c) can provide a controlled release of light flowing through the lightguide panel 606, to illuminate an area. Light can thus propagate in the lightguide panel 606 via internal reflection from the two major surfaces (606b, 606c), traveling from the light-source facing long edge towards an opposing edge, and illumination light can escape from the lightguide panel 606 through the major surfaces (606b, 606c) and/or the opposing edge. In some example, embodiments, the edges of the lightguide panel 606 other than the edge through which light enters the lightguide panel 606 may not be patterned or configured for releasing light therefrom.

A portion of the light that exits the lightguide panel 606 through the second major surface 606c may pass through the diffuser lens 112 and exit to an area to be illuminated through the light emitting aperture 108 formed between the side rail assemblies (102a, 102b). Further, another portion of the light that exits the lightguide panel 606 through the first major surface 606b may be reflected back towards the lightguide panel 606 by the reflector 608. The portion of the light that is reflected back towards the lightguide panel 606 by the reflector 608 may pass through the lightguide panel 606 and exit via the second major surface 606c of the lightguide panel 606 towards the area to be illuminated via the light emitting aperture 108.

In addition to passing through the diffuser lens 112, the light that exits the lightguide panel 606 through the second major surface 606c may pass through an optical film that may be disposed in an optical film cavity 706 (shown in FIG. 7) that is formed between the lower step surface 704 of the support flange 804 of each side rail assembly (102a, 102b) and the diffuser lens 112 of the light transmission assembly 110. The optical film that is disposed in the optical film cavity 706 may be spaced apart from the diffuser lens and may be configured to change an optical distribution of the light exiting the lightguide panel 606 and the modular luminaire 100 to a desired optical distribution, such as, but not limited to, asymmetric distribution, bat wing distribution, narrow beam distribution, etc.

The optical film may be removably coupled to the modular luminaire 100 thereby allowing an optical distribution of the light exiting the lightguide panel 606 and the modular luminaire 100 to be changed by replacing one optical film with another based on a desired optical distribution pattern. In a standalone configuration, the optical film may be installed by feeding a roll of the optical film into the optical film cavity 706 through one of the lateral ends (103a or 103b) of the modular luminaire 100, pulling it through the optical film cavity 706 along the entire length of the modular luminaire 100 (e.g., '1_m'), until reaching the opposite lateral end (103b or 103a) of the modular luminaire 100. However, in an example embodiment where a first modular luminaire 100a is row mounted with a second modular luminaire 100b as illustrated in FIG. 13, the optical film is installed by feeding the roll of optical film into the optical film cavity 706 of the first modular luminaire 100a in the row, and then pulling it along the entire length of the row of both the modular luminaires (100a, 100b), until reaching the opposite lateral end (103b or 103a) of the last modular luminaire (e.g., second modular luminaire 100b) of the row of modular luminaires (100a, 100b).

As illustrated in FIG. 6, the stack of components (202, 614, 608, 606, 112) that form the light transmission assembly 110 may be held together by a compression member 604a, 604b of each side rail assembly (102a, 102b). The compression member applies a compression force to a portion of light transmission assembly 110 disposed in the light assembly cavity 814 of each of the two side rail assemblies (102a, 102b). The compression force provides a compression fit to hold the stack of components (202, 614, 608, 606, 112) that form the light transmission assembly 110 securely within the side rail assemblies (102a, 102b) and prevent an undesirable vertical movement of the components (202, 614, 608, 606, 112) in the X-direction (vertical) and an undesirable movement in the Y-direction (i.e., in-out/normal to page).

Figure 9:
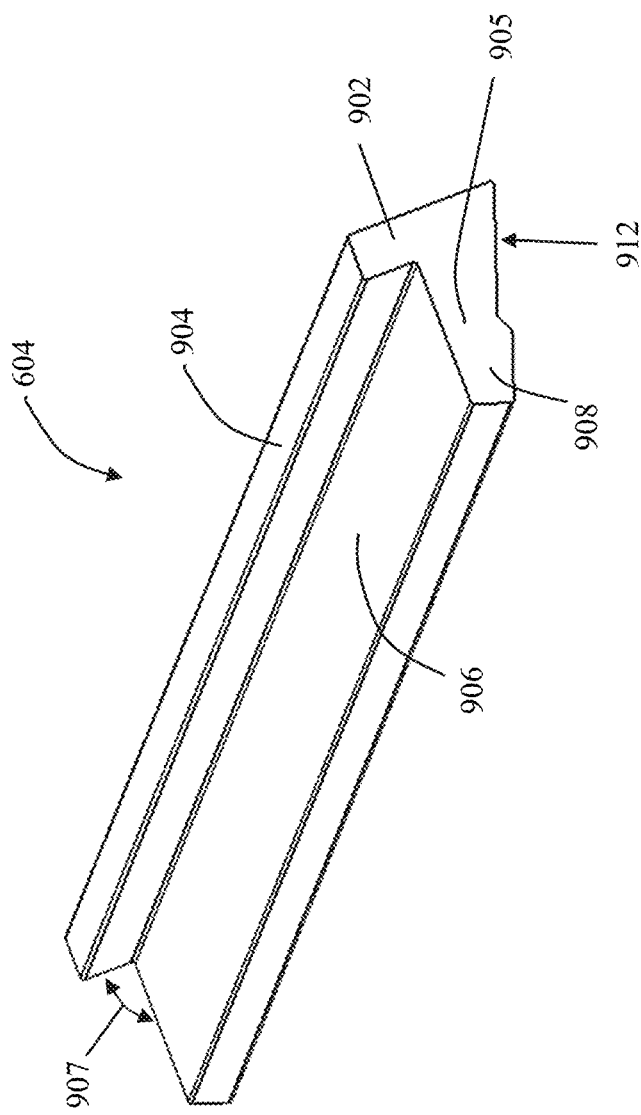
FIGS. 9 and 10 illustrate different perspective views of a compression member of the side rail assembly of the row mountable modular flat panel luminaire of FIG. 1, in accordance with example embodiments of the present disclosure.
Figure 10:
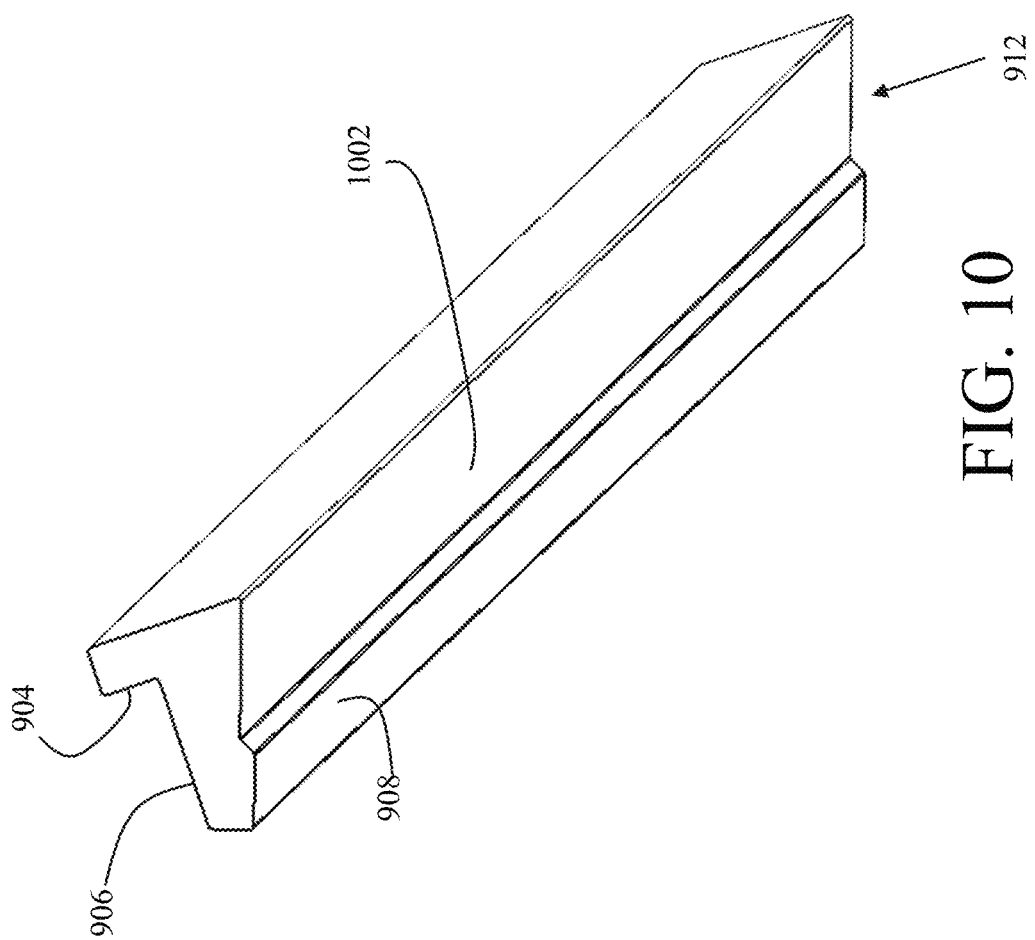

As illustrated in FIG. 9, the compression member 604 may include a side wall 902 and a bottom flange 905 that extends out and angularly from the inner surface 904 of the side wall 902 such that the bottom flange 905 forms an acute inner angle 907 with the side wall 902. Further, the compression member 604 may include a foot 908 that protrudes from a bottom surface 912 of the bottom flange 905 and extends along the length of the compression member 604.

As illustrated in FIGS. 3, 4, 6, and 7, the compression member 604 of each side rail assembly (102a, 102b) may be coupled to the main member 602 of the respective side rail assembly (102a, 102b) using fasteners 314. In particular, to couple the compression member 604 to the main member 602, the compression member 604 may be positioned with respect to the main member 602 such that: (a) the inner surface 904 of the side wall 904 of the compression member 604 engages an outer edge 887 of the bottom coupling flange 808 of the main member 602, (b) the top surface 906 of the bottom flange 905 of the compression member 604 engages the bottom surface 889 of the bottom coupling flange 808 of the main member 602, and (c) the foot 908 of the compression member 604 engages the back plate 202 of the light transmission assembly 110. Further, a fastener 314, such as a washer screw assembly, may be inserted in the threaded screw slot 810 of the main member 602, where the washer may be engage the top coupling flange 806 of the main member 602 and an outer surface of the side wall 902 of the compression member 604. Then, the screw of the washer screw assembly may be tightened to couple the compression member 604 to the main member 602 of the respective side rail assembly (102a, 102b). As the screw is tightened (i.e., the coupling between the compression member 604 to the main member 602 is tightened), the foot 908 of the compression member 604 pushes down and applies a vertical force on the light transmission assembly 110 to provide a compression fit to hold at least the portion of the light transmission assembly 110 disposed in the light assembly cavity 814 securely within the respective side rail assembly (102a, 102b). Further, as described above, the vertical force holds the components (202, 614, 608, 606, 112) that form the light transmission assembly 110 together and prevents an undesirable movement of the light transmission assembly 110 in the X-direction (vertical) and an undesirable movement in the Y-direction (i.e., in-out/normal to page).

Further, as illustrated in FIGS. 2-4 and 6, the modular luminaire 100 may include coupling brackets 206 that are configured to hold the two side rail assemblies (102a, 102b) together. The coupling brackets 206 may be coupled to both the side rail assemblies (102a, 102b) using fasteners 314 and may be disposed at both the lateral ends (103a, 103b) of the modular luminaire 100. In particular, as illustrated in FIGS. 3 and 4, each coupling bracket 206 may include a base 304, two side flanges 306 that extend angularly and away from the base 304 from opposite short ends of the base 304, and a fastening flange 302 that extends substantially perpendicular to the base 304 from a long end that is disposed between the two opposing short ends of the base 304. Further, each coupling bracket 206 may include mounting flanges 310 that protrude vertically from the base 304, and one or more draw latches 1302 (shown in FIG. 15) disposed between the mounting flanges 310 on the base 304.

The fastening flange 302 of the coupling bracket 206 may include fastening apertures 359 that are formed therein. The fastening apertures 359 may be configured to receive fasteners therethough to provide an alternate mechanism to couple the modular luminaire 100 with another modular luminaire (e.g., 100b) for continuous row mounting. That is, as an alternative to using the alignment rods 308 and the draw latches 1302, modular luminaires may be row mounted by passing fasteners through the fastening apertures 359 of the fastening flanges 302 associated with the coupling brackets 206 that are disposed at the adjoining lateral edges of the modular luminaires that are to be row mounted.

The mounting flanges 310 of each coupling bracket 206 may include a mounting hole 312 that is configured to receive appropriate mounting features therethrough for suspension mounting the modular luminaire 100. Alternatively, the threaded cavity 810 and/or the alignment slot 620 of the main member 602 of the each side rail assembly (102a, 102b) may be configured to receive appropriate mounting features therein for suspension or recess mounting the modular luminaire 100, such as, but not limited to, mousetrap springs, torsion springs, etc. Further, each of the side flanges 306 of the coupling bracket 206 may include apertures formed therein, where the apertures are configured to receive fasteners 314 therethrough to couple the coupling bracket 206 to the side rail assemblies (102a, 102b).

In particular, to couple the coupling bracket 206 to the side rail assemblies (102a, 102b), the coupling bracket 206 may be positioned on the back plate 202 of the light transmission assembly 110 such that: (a) an aperture of one of the side flanges 306 of the coupling bracket 206 is axially aligned with a threaded cavity 810 of the first side rail assembly 102a, (b) an aperture of the opposite side flange 306 of the coupling bracket 206 is axially aligned with the threaded cavity 810 of the second side rail assembly 102b, and (c) the fastening flange 302 is disposed adjacent a lateral edge (103a or 103b) of the modular luminaire 100. Responsive to positioning the coupling bracket 206 on the back plate 202 as described above, fasteners 314 may be passed through the axially aligned aperture of each side flange 306 of the coupling bracket 206 and the threaded cavity 810 of the respective side rail assembly (102a, 102b) to couple the coupling bracket 206 to the side rail assemblies (102a, 102b).

Returning to FIG. 8, the main member 602 of each side rail assembly (102a, 102b) may include a plate coupling hole 622 that is formed therein. In one example embodiment, the plate coupling hole 622 may be a through hole that extends from the first lateral end 103a of the main member 602 through the opposite second lateral end 103b of the main member 602. Alternatively, in another example embodiment, the plate coupling hole 622 may be a blind hole that is formed at both the lateral ends (103a, 103b) of the main member 602 of each side rail assembly (102a, 102b). In either case, the plate coupling hole 622 may be configured to receive a fastener 106 (shown in FIG. 1) therethrough to couple end plates 104a and 104b to the lateral ends (103a, 103b) of the side rail assemblies (102a, 102b).

The end plates 104a and 104b may be coupled to the side rail assemblies (102a, 102b) in a standalone configuration of the modular luminaire 100 to cover the lateral ends (103a, 103b) of the modular luminaire 100 as illustrated in FIG. 1. In other example embodiments where the modular luminaire 100 is row mounted with other modular luminaires as illustrated in FIGS. 13-15 and 18-19, one or both the end plates (104a, 104b) may be removed from the modular luminaire 100 to allow the modular luminaire 100 to be coupled to other modular luminaires of the same kind (e.g., 100b or 1600) at one or both the lateral ends (103a and/or 103b) of the modular luminaire 100. In particular, as illustrated in FIGS. 13-15, in a row mounting configuration, a lateral end 103a of an example first modular luminaire 100a may be coupled to the lateral end 103c of an example second modular luminaire 100b.

As illustrated in FIGS. 13-15, to row mount the example first luminaire 100a with the example second luminaire 100b, the lateral end 103a of the example first modular luminaire 100a may be aligned with the lateral end 103c of the example second modular luminaire 100b such that: (a) the alignment slot 620 of the first side rail assembly 102a of the example first modular luminaire 100a is axially aligned with the alignment slot 620 of the first side rail assembly 102c of the example second modular luminaire 100b, (b) the alignment slot 620 of the second side rail assembly 102b of the example first modular luminaire 100a is axially aligned with the alignment slot 620 of the second side rail assembly 102d of the example second modular luminaire 100b, and (c) the coupling bracket 206a of the example first modular luminaire 100a is aligned with and faces the coupling bracket 206b of the example second modular luminaire 100b.

Once the example first and second modular luminaires (100a, 100b) are positioned as described above, the alignment rod fasteners 402 of the alignment rods 308a and 308b disposed in the alignment slots 620 of the first side rail assembly 102c of the second modular luminaire 100a and the second side rail assembly 102b of the first modular luminaire 100a may be loosened. Then, the alignment rod 308a that is disposed in the alignment slot 620 of first side rail assembly 102c of the second modular luminaire 100b may be guided (slid) into the alignment slot 620 of first side rail assembly 102a of the first modular luminaire 100a such that a portion of the alignment rod 308a is disposed in the alignment slot 620 of first side rail assembly 102c of the second modular luminaire 100b while a remainder portion of the alignment rod 308b is disposed in the alignment slot 620 of first side rail assembly 102c of the second modular luminaire 100b. Similarly, the alignment rod 308b that is disposed in the alignment slot 620 of second side rail assembly 102b of the first modular luminaire 100a may be guided (slid) into the alignment slot 620 of second side rail assembly 102d of the second modular luminaire 100b. Then, the alignment rod fasteners 402 associated with the alignment rods 308a and 308b are tightened to securely hold the alignment rods 308a and 308b in place. Furthermore, the draw latch 1302 may be locked or latched to complete a row mounting of the example first and second modular luminaires (100a, 100b) as illustrated in FIGS. 13 and 14.

In other words, modular luminaires that are to be row mounted are positioned such that one side rail assembly of one modular luminaire is axially aligned with one side rail assembly of another modular luminaire while an opposite side rail assembly of the one modular luminaire is axially aligned with an opposite side rail assembly of the other modular luminaire. Further, at least one alignment rod of each modular luminaire is adjusted such that the at least one alignment rod is disposed in the alignment slots of the axially aligned side rail assemblies of both the modular luminaires. Furthermore, the draw latches of the both the modular luminaires are latched or locked to row mount the modular luminaires.

Even though the coupling brackets 206 illustrated in FIG. 15 does not include the fastening flange 302, one of skill in the art can understand and appreciate that in other example embodiments, the coupling brackets may include the fastening flange with a notch formed therein for enabling the hook end of a draw latch of the example first modular luminaire 100a to be coupled to the latch end of another draw latch of the example second modular luminaire 100b.

In one example embodiment, the hook side of the draw latch 1302 may be disposed on the coupling bracket 206a of the example first modular luminaire 100a and the latch side of the draw latch 1302 may be disposed on the coupling bracket 206b of the example second modular luminaire 100b, or vice-versa. In another example embodiment, the coupling brackets 206a and 206b of each of the example first and second modular luminaires (100a, 100b) may comprise both the hook side and the latch side of the draw latch 1302.

Figure 11:
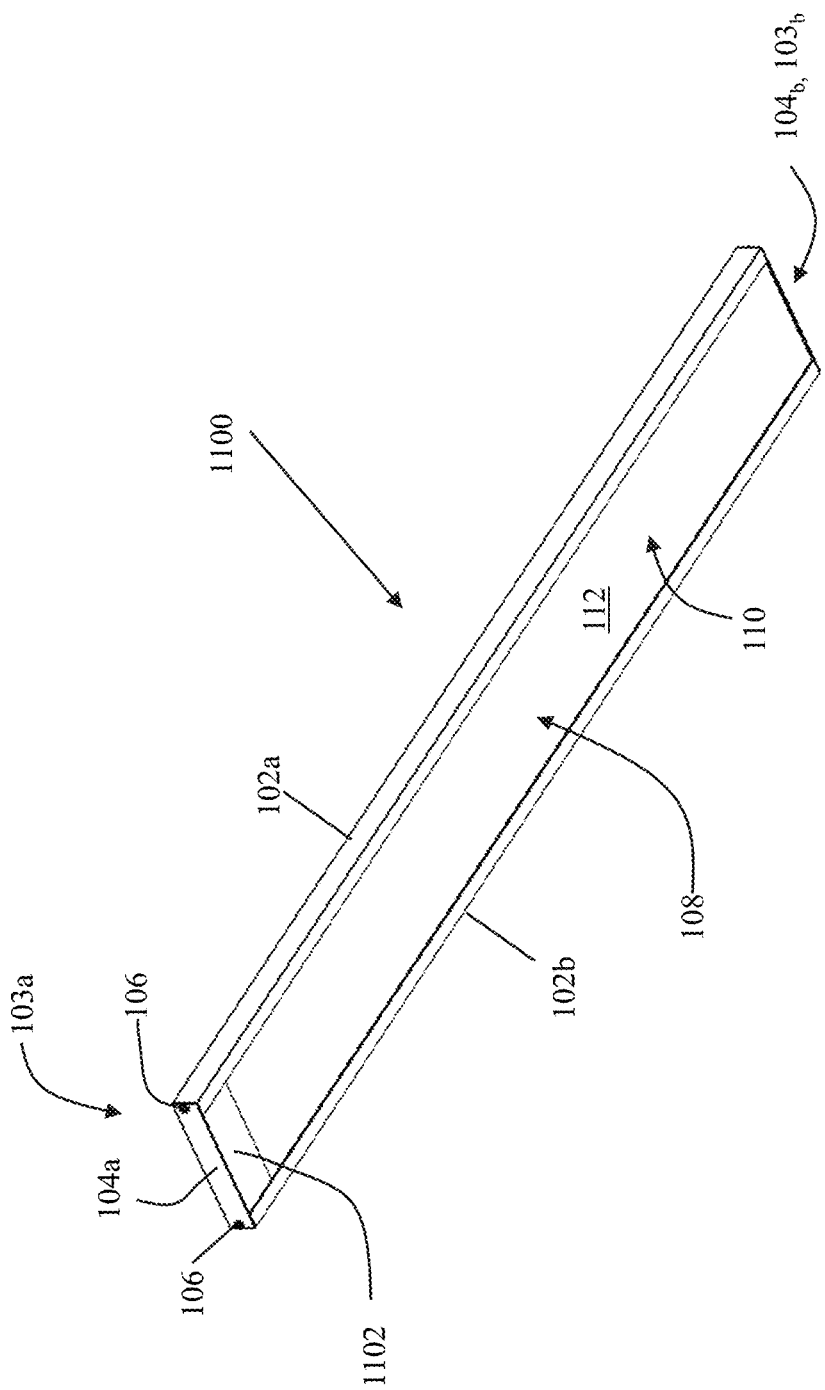
FIGS. 11 and 12 illustrate perspective views of another example row mountable modular flat panel luminaire and a sensor bracket of the row mountable flat panel luminaire, in accordance with example embodiments of the present disclosure.
Figure 12:
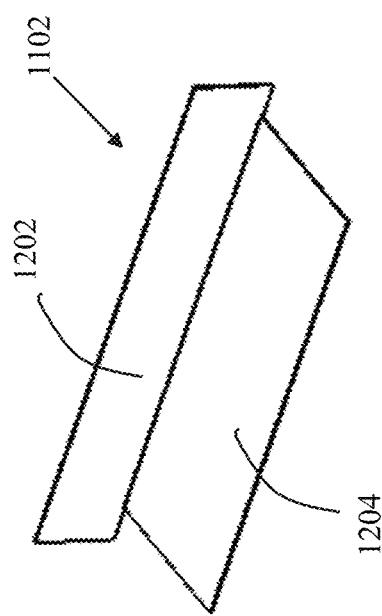

As illustrated in FIG. 11, in some example embodiments, the modular luminaire 1100 may include a sensor plate 1102 that is coupled to and disposed at a lateral end 103a of the modular luminaire 1100. The sensor plate 1102 may be configured to couple one or more sensors to the modular luminaire 1100. As illustrated in FIG. 12, the sensor plate 1102 may include a side flange 1202 and a sensor coupling flange 1204 that is substantially perpendicular to the side flange 1202. The sensor plate 1102 may be coupled to the modular luminaire 1100 such that the sensor coupling flange 1204 is disposed in the light emitting aperture 108 and below the light transmission assembly 110. Notches or openings may be formed in the light transmission assembly 110 and sensor coupling flange 1204 of the sensor plate 1102 to receive a sensor therethrough such that a sensing element of the sensor is exposed to the area to be illuminated. The sensor may include, but is not limited to, a motion sensor, camera, etc. In other example embodiments, the sensor plate 1102 may be configured to couple any other appropriate electrical or electronic device to the modular luminaire 100. For example, the sensor plate 1102 may be configured to support and couple an emergency test switch to the modular luminaire 100.

Figure 16:
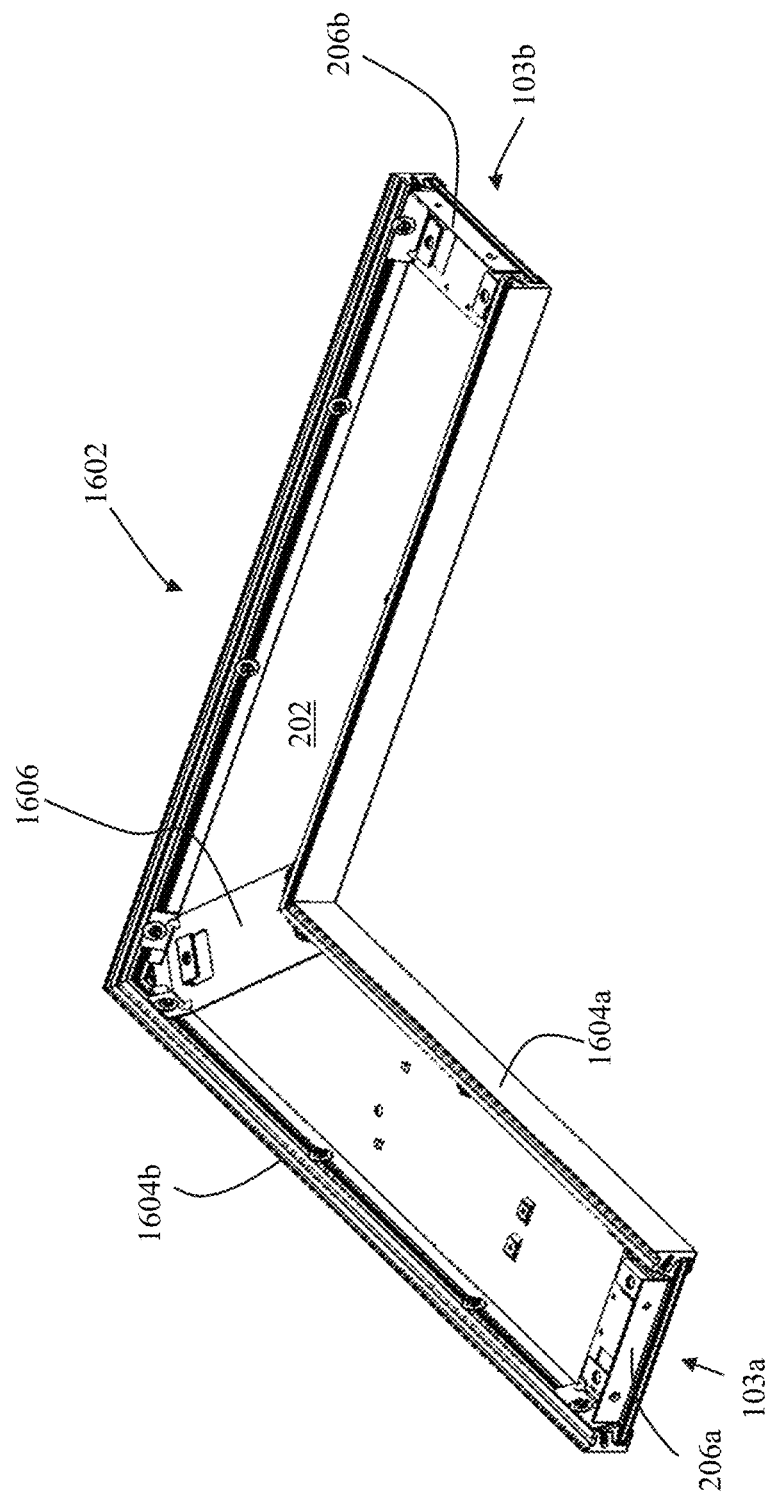
FIGS. 16 and 17 illustrate perspective views of yet another example row mountable modular flat panel luminaire that is substantially L-shaped, in accordance with example embodiments of the present disclosure.
Figure 17:
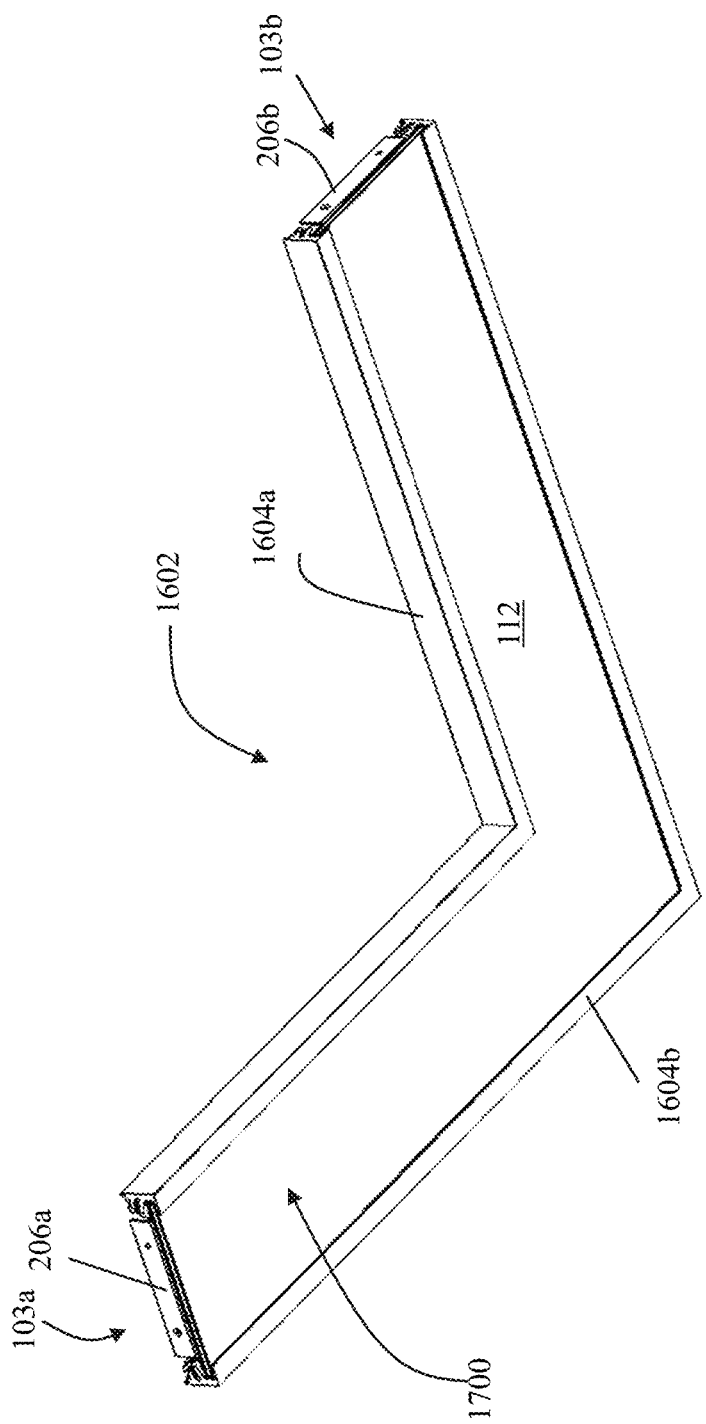
Figure 18:
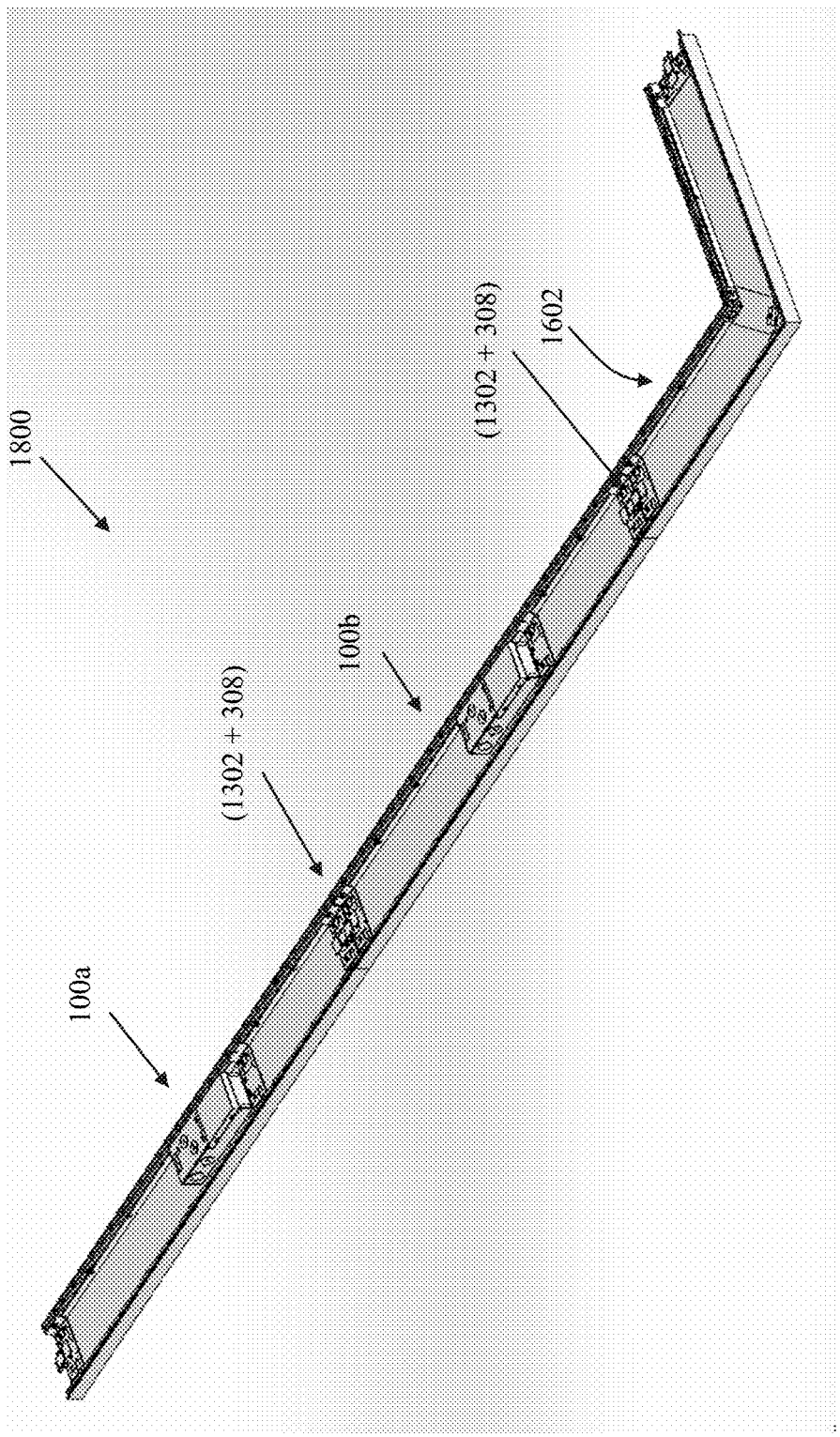
FIGS. 18 and 19 illustrate different perspective views of another example row mount assembly comprising three row mountable modular flat panel luminaires that are in a row mounted configuration, in accordance with example embodiments of the present disclosure.
Figure 19:
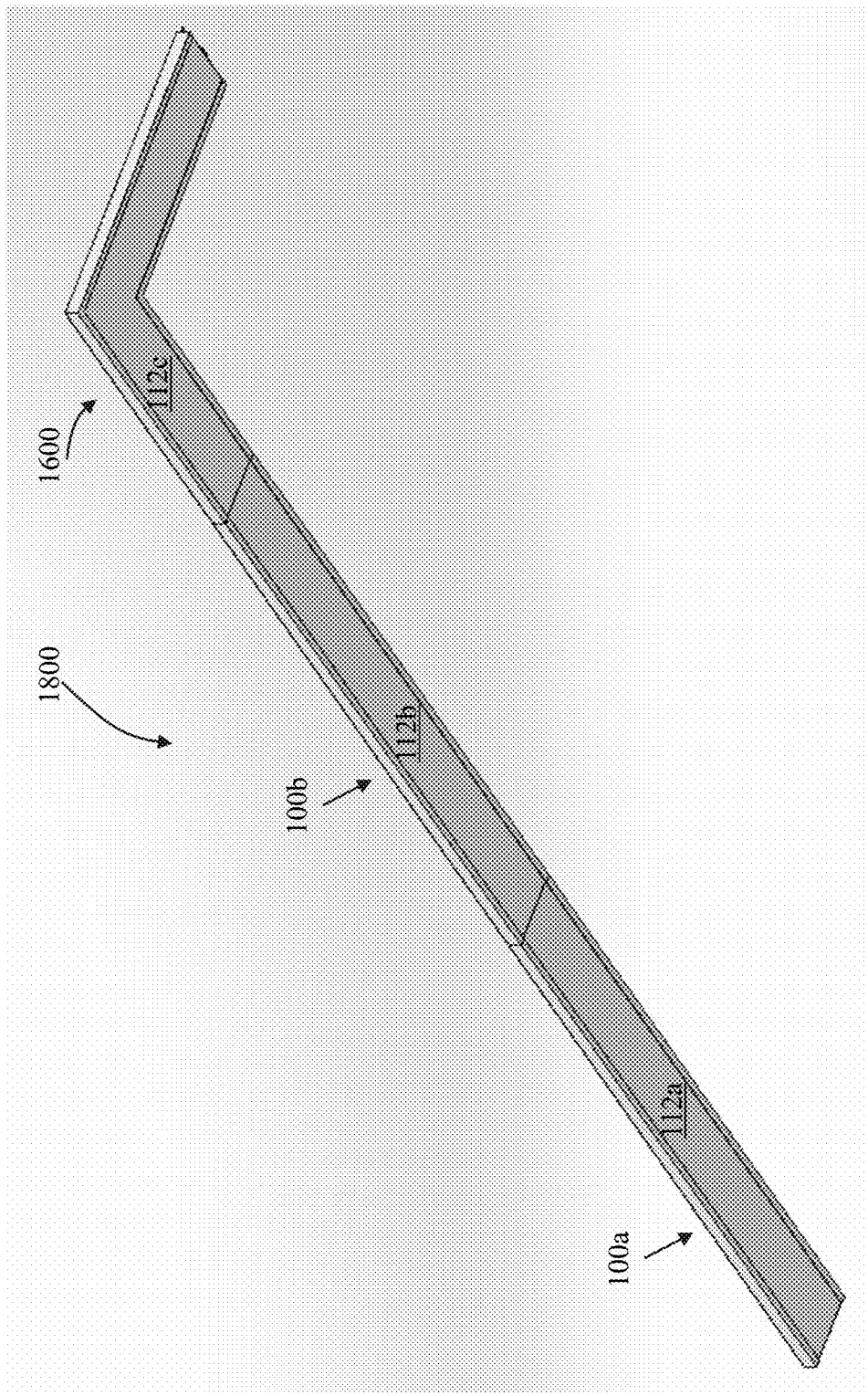
Figure 20:
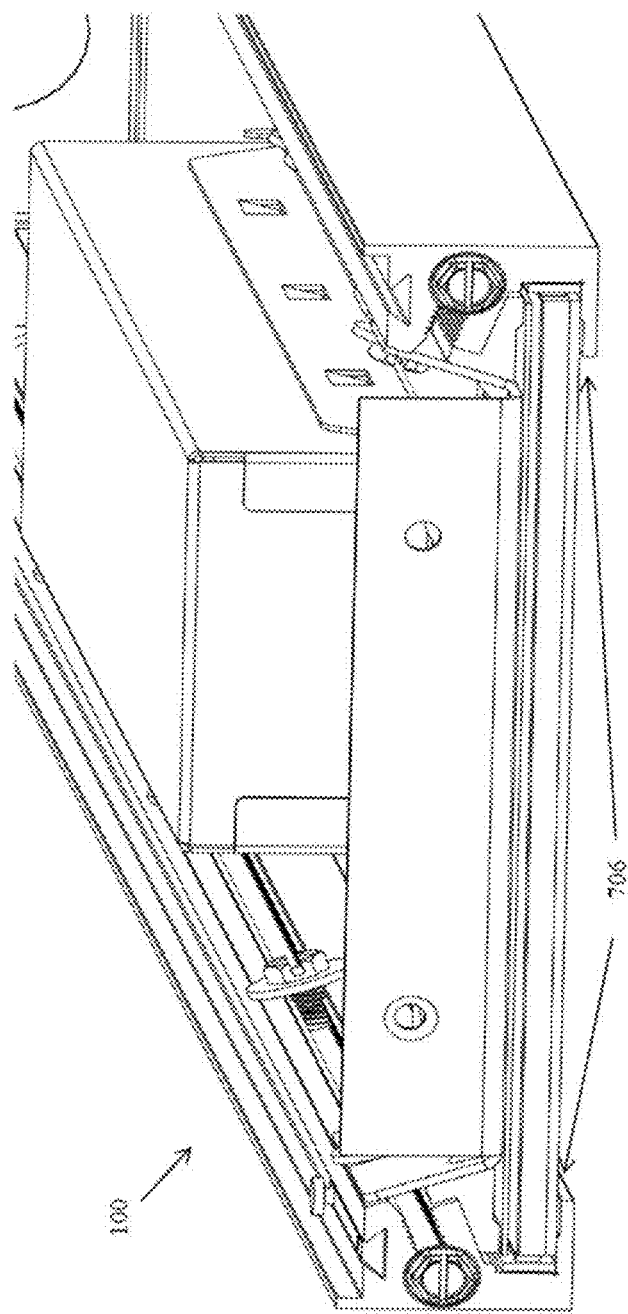
FIG. 20 illustrates a side view of the row mountable modular flat panel luminaire of FIG. 1, in accordance with example embodiments of the present disclosure.

Even though FIGS. 1-15 illustrate the modular luminaires of the present disclosure as having a substantially rectilinear shape, one of skill in the art can understand and appreciate that in other example embodiments the modular luminaire may have any other appropriate shape without departing from a broader scope of the present disclosure. For example, as illustrated in FIGS. 16-17, the modular luminaire 1602 may be L-shaped, where the side rail assemblies (1604a, 1604b) and the light transmission assembly 1700 of the modular luminaire 1602 that is disposed in between the side rail assemblies (1604a, 1604b) are substantially L-shaped. Further, as illustrated in FIGS. 18 and 19, a rectilinear shaped modular luminaire 100 may be row mounted with an L-shaped modular luminaire 1602 without departing from a broader scope of the present disclosure. The coupling or row mounting of the rectilinear shaped modular luminaire 100 with the L-shaped modular luminaire 1602 may be substantially similar to the coupling of two rectilinear modular luminaires (e.g., 100a, 100b) as described above and as illustrated in FIG. 15. Therefore, the coupling or row mounting of the rectilinear shaped modular luminaire 100 with the L-shaped modular luminaire 1602 will not be repeated herein for the sake of brevity.

Figure 21:
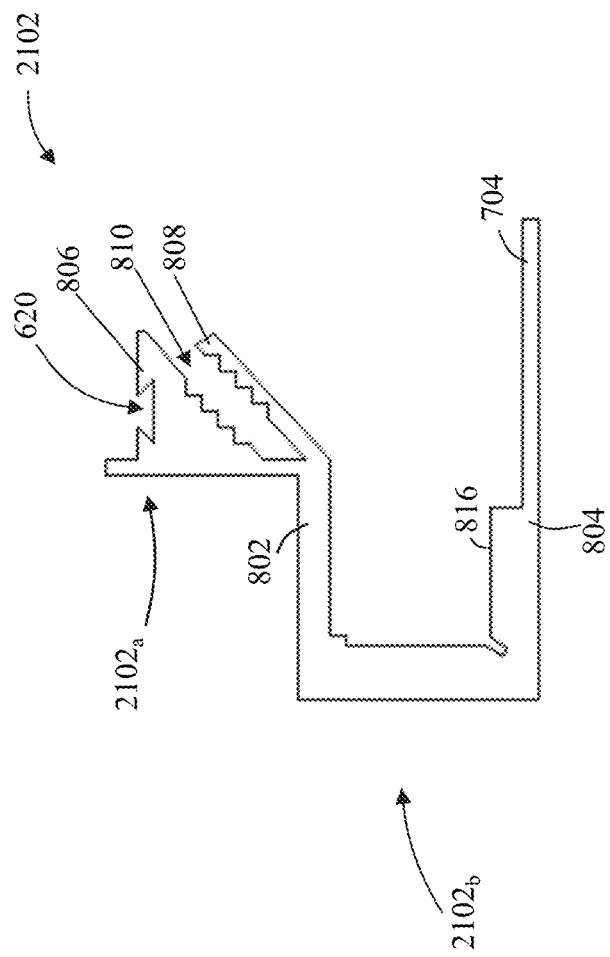
FIG. 21 illustrates another example embodiment of a main member of a side rail assembly of the row mountable modular flat panel luminaire, in accordance with example embodiments of the present disclosure.

Further, even though FIGS. 1-4, 6, 8, 11, and 13-19 illustrate the main member 602 of each side rail assembly (102a, 102b, 1604a, 1604b) having a specific shape, one of skill in the art can understand and appreciate that in other example embodiments, the main member 602 and/or the compression member 604 may have a different shape without departing from the broader scope of the present disclosure. For example, as illustrated in FIG. 21, the main member 2102 may be shaped such that the thickness of the modular luminaire that extends below the ceiling after installation may be reduced. The modular luminaire 100 that is illustrated in FIGS. 1-4, 6, 8, 11, and 13-19 may be installed in the ceiling such that the top edge 801 of the main member 602 of each side rail assembly (102a, 102b) of the modular luminaire 100 engages the ceiling and the full thickness of the main member 602 of the side rail assemblies (102a, 102b) of the modular luminaire 100 protrudes below the ceiling. The height of the main member 602 illustrated in FIGS. 1-4, 6, 8, 11, and 13-19 may be approximately 1 inch. As such, when a modular luminaire as illustrated in FIGS. 1-4, 6, 8, 11, and 13-19 is installed in the ceiling, the full thickness of the modular luminaire 100, i.e., 1 inch of the modular luminaire extends below the ceiling. However, when the main member 602 of the side rail assemblies (102a, 102b) of the modular luminaire 100 is replaced with the main member 2102 as illustrated in FIG. 21, only the bottom portion 2102b of the main member 2102 extends below the ceiling while the remaining top portion 2102a is disposed in an aperture in the ceiling, thereby reducing the thickness of modular luminaire that protrudes below the ceiling. This in turn provides a thinner appearance to the modular luminaire. The thickness of the bottom portion 2102 may be ½ inch. So, only ½ inch of the modular luminaire may extend or protrude below the ceiling.

Furthermore, even though the present disclosure describes a modular luminaire having a width 'w' (shown in FIG. 2) that is approximately 6 inches, one of skill in the art can understand and appreciate that in other example embodiments, the modular luminaire may be wider or narrower without departing from a broader scope of the present disclosure. For example, the modular luminaire may have a width 'w' of approximately 4 inches, 2 inches, or 8 inches. The width of the light transmission assembly 110, the optical film, and the shape of the coupling brackets 206 may vary based on the width of the modular luminaire 100. Similarly, the modular luminaire can have different lengths. For example, the length and widths of the different modular luminaires may include, but are not limited to, 4 feet*6 inches, or 2 feet*6 inches, or 4 feet*4 inches, 2 feet*4 inches, etc.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A luminaire comprising:
   a first side rail assembly that includes a first alignment slot and a first light assembly cavity formed therein;
   a first alignment rod disposed in the first alignment slot;
   a second side rail assembly disposed opposite to and spaced apart from the first side rail assembly such that the first side rail assembly and the second side rail assembly define a light emitting aperture therebetween, the second side rail assembly comprising a second alignment slot;
   a second alignment rod disposed in the second alignment slot;
   a coupling bracket that is coupled to the first side rail assembly and the second side rail assembly, the coupling bracket comprising a latch disposed thereon;
   a light source disposed in the first light assembly cavity of the first side rail assembly; and
   a light transmission assembly comprising a lightguide panel that is supported by and disposed between the first side rail assembly and the second side rail assembly such that:
   (a) at least a portion of the light transmission assembly covers the light emitting aperture, and (b) an edge of the lightguide panel is positioned adjacent the light source to receive light therefrom and emit the light through a major surface of the lightguide panel and the light emitting aperture, the edge of the lightguide panel being substantially perpendicular to the major surface of the lightguide panel.

2. The luminaire of claim 1, wherein the latch and one of the first alignment rod and the second alignment rod operate in concert to row mount the luminaire with another luminaire.

3. The luminaire of claim 1, wherein each of the first alignment rod and the second alignment rod comprises one or more coupling holes that are configured to receive alignment rod fasteners therethrough to prevent an axial movement of the first alignment rod within the first alignment slot and the second alignment rod within the second alignment slot.

4. The luminaire of claim 1, wherein each of the first side rail assembly and the second side rail assembly comprises:
a main member that includes:
a side wall extending from a top edge to a bottom edge,
a support flange disposed at the bottom end of the side wall;
a top coupling flange that is offset from the top edge of the side wall, and
a bottom coupling flange that is disposed below the top coupling flange; and
a compression member that is removably coupled to the main member.

5. The luminaire of claim 4, wherein the top coupling flange and the bottom coupling flange define a threaded cavity that is configured to receive a fastener therein to removably couple the compression member to the main member.

6. The luminaire of claim 4:
wherein the first alignment slot is formed in the top coupling flange of the main member of the first side rail assembly and the second alignment slot is formed in the top coupling flange of the main member of the second side rail assembly, and
wherein the first light assembly cavity is formed between the bottom coupling flange and the support flange of the main member of the first side rail assembly and the second light assembly cavity is formed between the bottom coupling flange and the support flange of the main member of the second side rail assembly.

7. The luminaire of claim 4, wherein a top surface of the support flange defines a stepped shoulder that comprises an upper step surface and a lower step surface, and wherein a longitudinal edge of the light transmission assembly is supported by and disposed on the upper step surface of the support flange.

8. The luminaire of claim 7:
wherein the lower step surface of the main member of the first side rail assembly, the lower step surface of the main member of the second side rail assembly, and the light transmission assembly disposed between the first side rail assembly and the second side rail assembly define an optical film cavity, and
wherein the optical film cavity is configured to receive an optical film therein such that the optical film is spaced apart from the light transmission assembly, the optical film being configured to change an optical distribution of the light exiting the light transmission assembly.

9. The luminaire of claim 4:
wherein the compression member comprises a foot that protrudes from a bottom surface of the compression member,
wherein when a coupling between the compression member and the main member is tightened: (a) the foot of the compression member engages the light transmission assembly, and (b) the compression member applies a compression force on the light transmission assembly to hold securely retain the light transmission assembly between the first side rail assembly and the second side rail assembly.

10. The luminaire of claim 1, wherein the luminaire is rectilinear shaped.

11. The luminaire of claim 1, wherein the luminaire is L-shaped.

12. The luminaire of claim 1, wherein the light transmission assembly of the luminaire further comprises a reflector and a diffuser lens, and wherein the lightguide panel is disposed between the diffuser lens and the reflector such that the diffuser lens is disposed on the major surface of the lightguide panel.

13. A row mounted luminaire assembly comprising:
a first luminaire that comprises:
a pair of first side rail assemblies, each first side rail assembly comprising a first alignment slot having a first alignment rod disposed therein and a first light assembly cavity;
a first coupling bracket that is coupled to the pair of first side rail assemblies and comprising a first latching device disposed thereon;
a first light source that is disposed in the first light assembly cavity of one of the pair of first side rail assemblies; and
a first light transmission assembly that is supported on and disposed between the pair of first side rail assemblies; and
a second luminaire that comprises:
a pair of second side rail assemblies, each second side rail assembly comprising a second alignment slot having a second alignment rod disposed therein and a second light assembly cavity;
a second coupling bracket that is coupled to the pair of second side rail assemblies and comprising a second latching device disposed thereon;
a second light source that is disposed in the second light assembly cavity of one of the pair of second side rail assemblies; and
a second light transmission assembly that is supported on and disposed between the pair of second side rail assemblies,
wherein the first luminaire is coupled to the second luminaire using the first alignment rod of at least one of the pair of first side rail assemblies, the second alignment rod of at least one of the pair of second side rail assemblies, the first latching device, and the second latching device to form a continuous row of luminaires.

14. The row mounted luminaire assembly of claim 13, wherein when the first luminaire is coupled to the second luminaire to form the continuous row of luminaires:
the first alignment rod of one of the pair of first side rail assemblies is disposed in both the first alignment slot of the one of the pair of first side rail assemblies of the first luminaire and the second alignment slot of one of the pair of second side rail assemblies of the second luminaire, the one of the pair of first side rail assemblies and the one of the pair of second side rail assemblies being axially aligned, the second alignment rod of another one of the pair of second side rail assemblies is disposed in both the second alignment slot of the another one of the pair of second side rail assemblies of the second luminaire and the first alignment slot of another one of the pair of first side rail assemblies of the first luminaire, the another one of the pair of first side rail assemblies and the another one of the pair of second side rail assemblies being axially aligned, and the first latching device of the first luminaire is coupled to the second latching device of the second luminaire.

15. The row mounted luminaire assembly of claim 13, wherein the first latching device and the second latching device are complementary, and wherein the first latching device and the second latching device define a draw latch device.

16. The row mounted luminaire assembly of claim 13, wherein each of the first luminaire and the second luminaire is rectilinear shaped.

17. The row mounted luminaire assembly of claim 13, wherein the first luminaire is rectilinear shaped and the second luminaire is substantially L-shaped.

18. The row mounted luminaire assembly of claim 13, wherein the first light source that is disposed in the first light assembly cavity of the one of the pair of first side rail assemblies is positioned adjacent an edge of a first lightguide panel of the first light transmission assembly, the first lightguide panel being configured to receive light emitted by the first light source through the edge and emit the light through a major surface of the first lightguide panel that is substantially perpendicular to the edge.

19. The row mounted luminaire assembly of claim 13, wherein the first luminaire comprises an optical film cavity that is defined by the pair of first side rail assemblies and configured to receive an optical film therein such that the optical film is spaced apart from and positioned below the first light transmission assembly, and wherein the optical film is configured to change an optical distribution of the light exiting the first light transmission assembly.

20. The row mounted luminaire of claim 13, wherein the first alignment slot and the second alignment slot are substantially dovetail shaped, and wherein the first alignment rod and the second alignment rod are substantially dovetail shaped.

* * * * *